US011015725B2

(12) United States Patent
Lee et al.

(10) Patent No.: US 11,015,725 B2
(45) Date of Patent: May 25, 2021

(54) FOUR-WAY VALVE FOR SWITCHING REFRIGERANT CHANNEL

(71) Applicant: LG Electronics Inc., Seoul (KR)

(72) Inventors: Seungjun Lee, Seoul (KR); Sungwook Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 1 day.

(21) Appl. No.: 16/341,231

(22) PCT Filed: Oct. 10, 2017

(86) PCT No.: PCT/KR2017/011137
§ 371 (c)(1),
(2) Date: Apr. 11, 2019

(87) PCT Pub. No.: WO2018/070761
PCT Pub. Date: Apr. 19, 2018

(65) Prior Publication Data
US 2019/0257436 A1    Aug. 22, 2019

(30) Foreign Application Priority Data

Oct. 11, 2016  (KR) .................. 10-2016-0131134
Jan. 26, 2017  (KR) .................. 10-2017-0012995

(51) Int. Cl.
*F16K 11/074*     (2006.01)
*F16K 11/16*      (2006.01)
(Continued)

(52) U.S. Cl.
CPC ........ *F16K 11/163* (2013.01); *F16H 61/0009* (2013.01); *F16K 3/02* (2013.01); *F16K 3/04* (2013.01); *F16K 11/072* (2013.01); *F16K 31/04* (2013.01); *F16K 37/00* (2013.01); *F16K 49/005* (2013.01); *F25B 41/04* (2013.01);
(Continued)

(58) Field of Classification Search
CPC .................... F16K 11/0743; Y10T 137/86839
See application file for complete search history.

(56) References Cited

U.S. PATENT DOCUMENTS 3,633,623 A * 1/1972 Perry ................. F16K 11/0743
                                                        137/625.46
4,139,355 A * 2/1979 Turner ............... F16K 11/0743
                                                        137/625.43
(Continued)

*Primary Examiner* — Robert K Arundale
(74) *Attorney, Agent, or Firm* — Fish & Richardson P.C.

(57) ABSTRACT

A four-way valve for switching a refrigerant flow path includes: a housing part including a refrigerant filling chamber configured to receive refrigerant; a valve plate disposed at one side of the housing part and having at least three inflow/outflow holes formed therein; a valve pad part disposed in the refrigerant filling chamber, rotating to contact one of surfaces of the valve plate, and occupying one of the at least three inflow/outflow holes continuously and occupying selectively one of the remaining holes of the at least three inflow/outflow holes so as to make the occupied inflow/outflow holes communicate with each other, thereby forming a changed flow path; a rotation drive part for transferring a driving force to rotate the valve pad part; and a deceleration part, disposed between the rotation drive part and the valve pad part, for increasing a driving torque transferred from the rotation drive part.

19 Claims, 23 Drawing Sheets

(51) Int. Cl.
*F16H 61/00* (2006.01)
*F16K 49/00* (2006.01)
*F16K 11/072* (2006.01)
*G01D 5/14* (2006.01)
*F16K 31/04* (2006.01)
*F16K 3/02* (2006.01)
*F16K 3/04* (2006.01)
*F25B 41/04* (2006.01)
*F16K 37/00* (2006.01)
*F25B 30/02* (2006.01)

(52) U.S. Cl.
CPC ............... *G01D 5/14* (2013.01); *F25B 30/02* (2013.01); *Y10T 137/86839* (2015.04)

(56) References Cited

U.S. PATENT DOCUMENTS

| | | | | | |
|---|---|---|---|---|---|
| 5,462,085 | A | * | 10/1995 | Iwata | ............... F16K 11/074 137/625.43 |
| 6,234,207 | B1 | * | 5/2001 | Toyama | ............... F16K 11/074 137/625.43 |
| 6,491,063 | B1 | * | 12/2002 | Benatav | ............... F25B 41/046 137/625.43 |
| 2001/0013369 | A1 | * | 8/2001 | Sasada | ............... F25B 41/046 137/625.43 |
| 2004/0221607 | A1 | * | 11/2004 | Heyl | ............... F25B 13/00 62/324.1 |

* cited by examiner (a)

(b)

FOUR-WAY VALVE FOR SWITCHING REFRIGERANT CHANNEL

CROSS-REFERENCE TO RELATED APPLICATIONS

This application is a National Stage application under 35 U.S.C. § 371 of International Application No. PCT/KR2017/011137, filed on Oct. 10, 2017, which claims the benefit of Korean Application No. 10-2017-0012995, filed on Jan. 26, 2017, and Korean Application No. 10-2016-0131134, filed on Oct. 11, 2016. The disclosures of the prior applications are incorporated by reference in their entirety.

TECHNICAL FIELD

The present invention relates to a four-way valve for switching a refrigerant flow path, and more particularly, to a four-way valve for switching a refrigerant flow path for improving a switching force by increasing a primary driving torque of a valve pad part, and improving the performance and durability of a product by increasing a sealing function.

BACKGROUND ART

Generally, in the case of an air conditioner that performs cooling or heating using a phase change of a refrigerant, an indoor heat exchanger is disposed in a room, and an outdoor heat exchanger is disposed outside the room. In cooling, a refrigerant discharged from a compressor is supplied to the outdoor heat exchanger, and the indoor heat exchanger serves as an evaporator to cool the room. In heating, the refrigerant discharged from the compressor is supplied to the indoor heat exchanger, and the indoor heat exchanger serves as a condenser to heat the room.

In this case, whether the high-temperature and high-pressure refrigerant discharged from the compressor flows into the indoor heat exchanger or the outdoor heat exchanger is determined by the switching operation of the four-way valve for switching the refrigerant flow path.

The four-way valve for switching the refrigerant flow path includes a valve body provided with a refrigerant filling chamber filled with refrigerant. The valve body is connected to a compressor, a first heat exchanger, a second heat exchanger, and an accumulator to circulate the refrigerant.

Here, the valve body may be provided with a switching body for switching the high temperature and high pressure refrigerant discharged from the compressor to any one of the first heat exchanger and the second heat exchanger. The switching body has a certain switching flow path so that the above-described refrigerant can be switched while being moved inside the valve body.

However, an example of the four-way valve for switching the refrigerant flow path according to the related art is that, due to the external pressure of the valve received by the refrigerant filled in the valve body and the inertia moment according to the external shape and weight of the switching body, there is a problem that the initial driving torque of a drive motor provided for pivoting the switching body must be increased.

Further, in the case where the driving motor driven by the electric force is provided outside the valve body, there is no possibility of a sealing problem related to the outflow of the refrigerant. However, in this case, a configuration for transmitting the driving force may be complicated, and when the drive motor is provided inside the valve body, there is a burden that the sealing must be completed in relation to the refrigerant.

DISCLOSURE

Technical Problem

The present invention has been made in view of the above problems, and provides a four-way valve for switching a refrigerant flow path which can improve a switching force by increasing the initial driving torque of a valve pad part and improve the durability by preventing the leakage of the refrigerant.

The problems of the present invention are not limited to the above-mentioned problems, and other problems not mentioned can be clearly understood by those skilled in the art from the following description.

Technical Solution

In an aspect, there is provided a four-way valve for switching a refrigerant flow path, including: a housing part including a refrigerant filling chamber which is filled with a refrigerant; a valve plate disposed at one side of the housing part and having at least three inflow/outflow holes formed therein; a valve pad part disposed in the refrigerant filling chamber, rotating to contact one of surfaces of the valve plate, and continuously occupying one (hereinafter, referred to as a 'first hole') of the at least three inflow/outflow holes, and selectively occupying one (hereinafter, referred to as a 'second hole') of the remaining holes of the at least three inflow/outflow holes so as to make the occupied inflow/outflow holes communicate with each other, thereby forming a changed flow path; a rotation drive part for transferring a driving force to rotate the valve pad part; and a deceleration part, disposed between the rotation drive part and the valve pad part, for increasing a driving torque transferred from the rotation drive part.

The details of other embodiments are included in the detailed description and drawings.

Advantageous Effects

According to an embodiment of the present invention, there is one or more of the following effects.

First, when the driving force generated from the rotation drive part is transmitted to the valve pad part, the rotational speed is reduced through the deceleration part disposed therebetween and the driving torque is increased to be transmitted to the valve pad part. Thus, the valve pad part can be effectively driven.

Second, since the valve plate rotatably connected to the valve pad part is formed in a non-circular shape, the number of connection ports connecting the valve plate and the bottom surface of the housing part can be reduced, thereby reducing manufacturing cost of the product.

The effects of the present invention are not limited to the effects mentioned above, and other effects not mentioned can be clearly understood by those skilled in the art from the description of the claims.

MODE FOR INVENTION

Figure 1A:
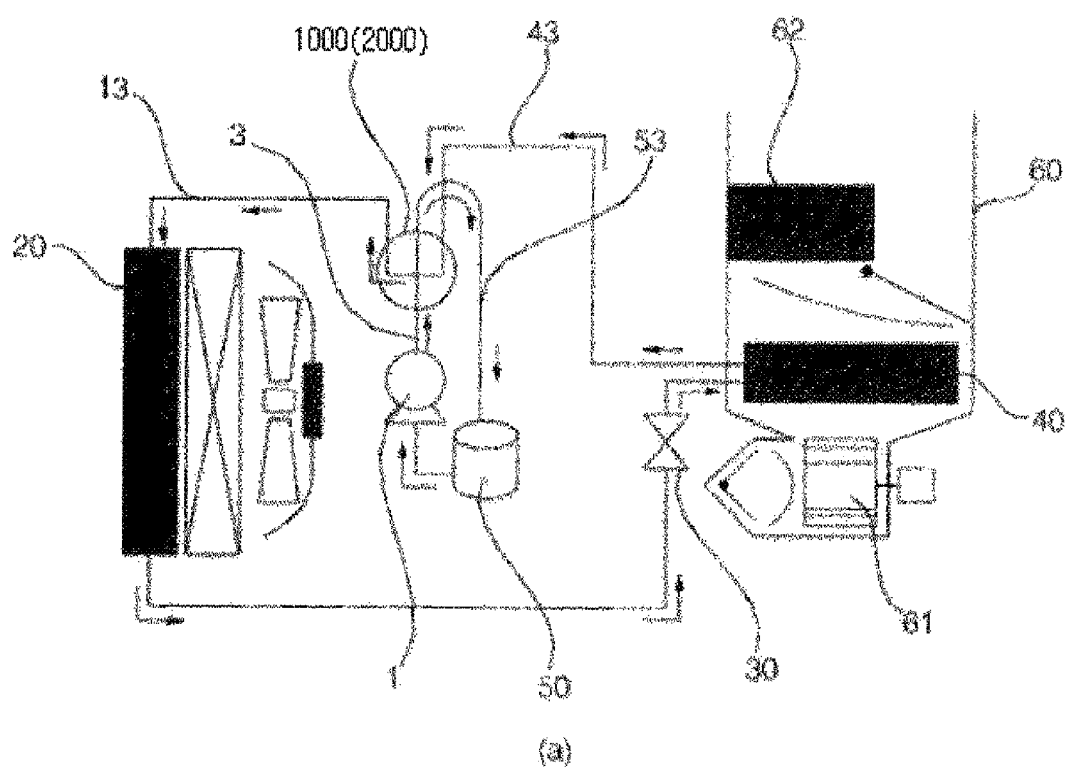
FIG. 1A and FIG. 1B are a refrigerant flow view showing the flow of refrigerant during cooling and heating operation.

Hereinafter, preferred embodiments of the present invention will be described with reference to the accompanying drawings. In describing the present embodiment, the same designations and the same reference numerals are used for the same components, and further description thereof will be omitted.

Hereinafter, a four-way valve for switching a refrigerant flow path according to an embodiment of the present invention will be described in detail with reference to the drawings.

FIG. 1A is a refrigerant flow view showing the flow of refrigerant during cooling operation.

Figure 1B:
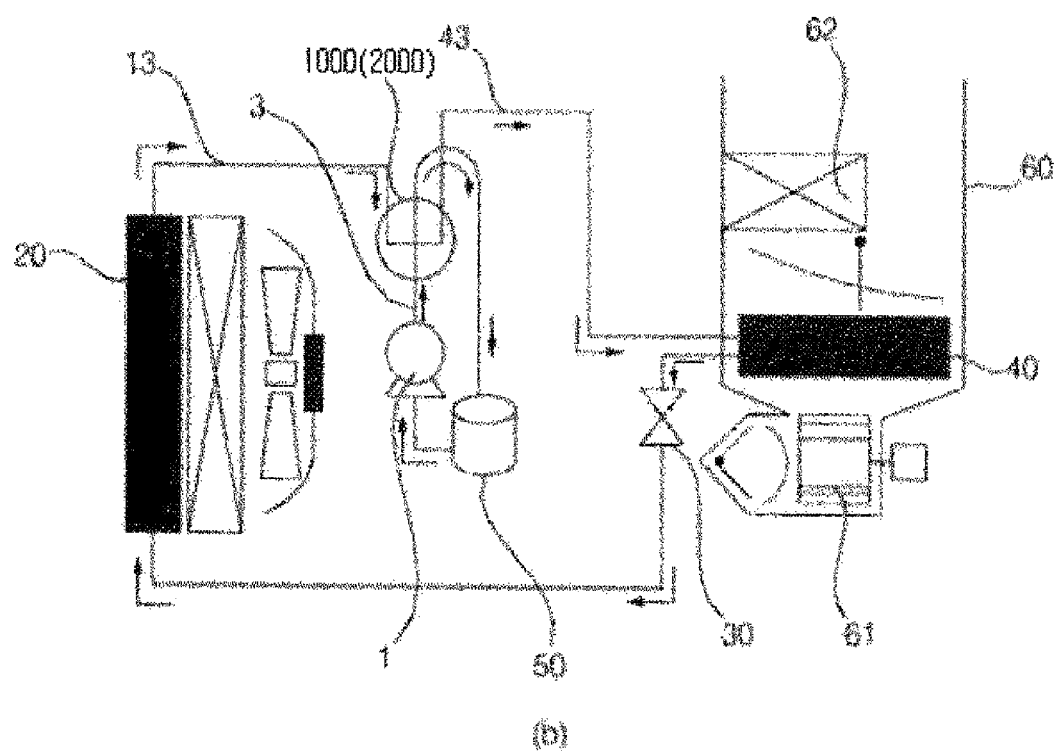

FIG. 1B is a refrigerant flow view showing the flow of refrigerant during heating operation.

Figure 2:
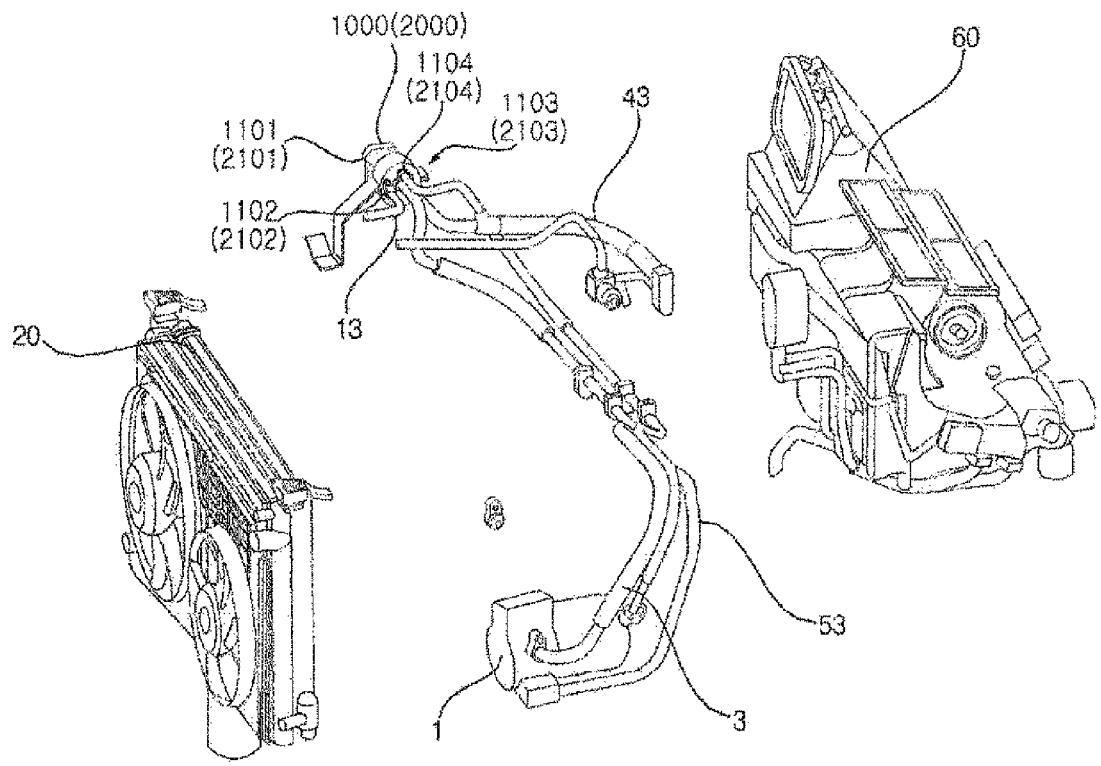
FIG. 2 is a schematic view showing an HVAC module of a vehicle equipped with a four-way valve for switching a refrigerant flow path according to the present invention.

FIG. 2 is a schematic view showing an HVAC module of a vehicle equipped with a four-way valve for switching a refrigerant flow path according to the present invention.

Figure 3:
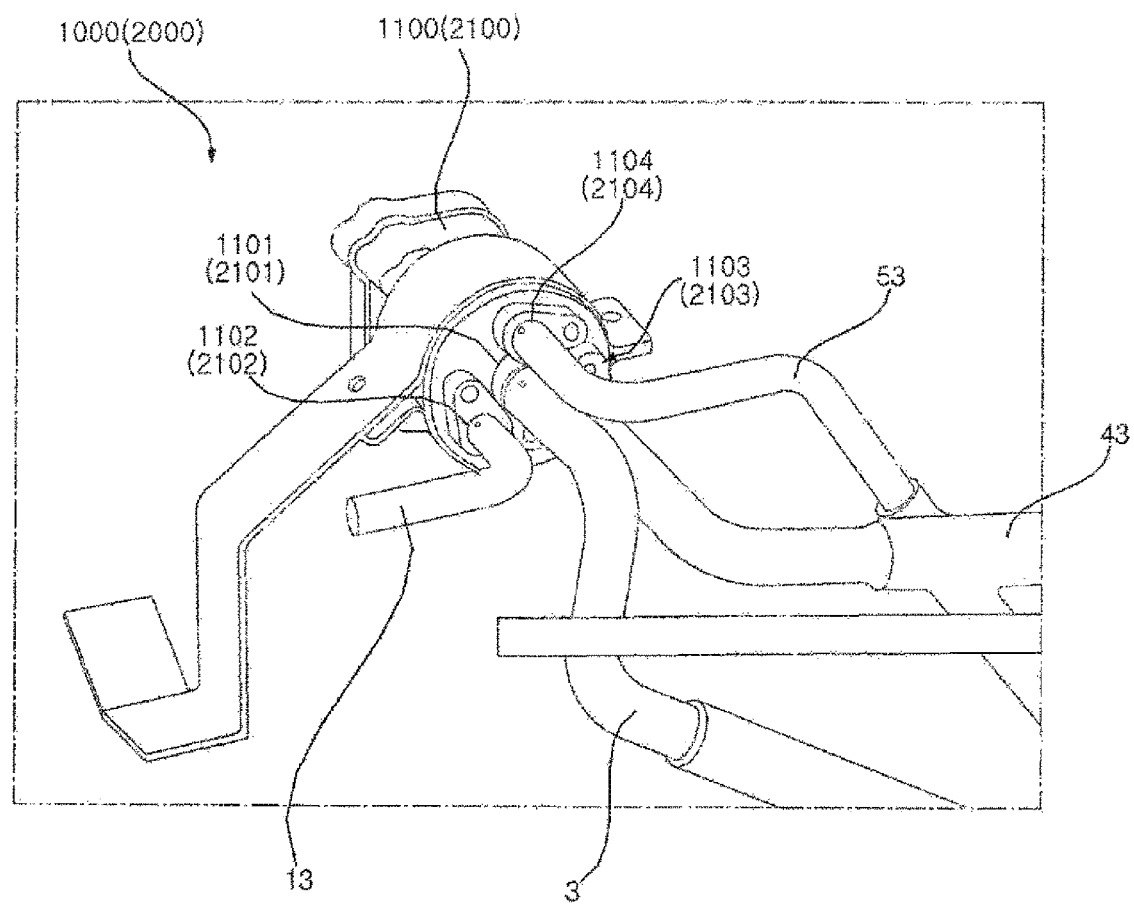
FIG. 3 is a perspective view showing a connection between a four-way valve and various refrigerant pipes among configurations of FIG. 2.

FIG. 3 is a perspective view showing a connection between a four-way valve and various refrigerant pipes among configurations of FIG. 2.

Referring to FIGS. 1 to 3, in the embodiment of a four-way valve for switching a refrigerant flow path according to the present invention, various refrigerant pipes 3, 13, 43, and 53 are directly connected to a housing part 1100, 2100 so that a refrigerant flow path for implementing a refrigeration cycle can be changed.

A refrigerant flow during cooling or heating operation in a vehicle by using the four-way valve for switching the refrigerant flow path according to the present invention having the above-described structure will be described.

Firstly, as shown in FIG. 1A, during cooling operation, when the high-temperature and high-pressure refrigerant is discharged from a compressor 1, it is supplied to a first heat exchanger 20 provided outside the vehicle by a four-way valve 1000, 200 and is condensed. In addition, the refrigerant condensed by the first heat exchanger 20 is expanded by an expansion valve 30 and then supplied to a second heat exchanger 40 provided in a Heating, Ventilating and Air Conditioning (HVAC) housing 60 and is evaporated. It exchanges heat with indoor air introduced into the HVAC housing 60 to cool the room, then flows into the four-way valve 1000, 200 again, and is recovered to an accumulator 50 and is circulated to be introduced into the compressor 1.

Next, as shown in FIG. 1B, during heating operation, when the high-temperature and high-pressure refrigerant is discharged from the compressor 1, it is directly supplied to the second heat exchanger 40 provided in the HVAC housing 60 by the four-way valve 1000, 200 and is condensed. At this time, the second heat exchanger 40 exchanges heat with the room air introduced into the HVAC housing 60, and the room is heated and air-conditioned.

In addition, the refrigerant condensed by the second heat exchanger 40 is expanded by the expansion valve 30 and then supplied to the first heat exchanger 20 provided outside the room to be evaporated. Then, it is recovered again to the accumulator 50 via the four-way valve 1000, 200 and is circulated to be introduced into the compressor 1.

Hereinafter, a refrigerant pipe connecting the compressor 1 and the four-way valve 1000, 200 is referred to as a 'compressor discharge pipe 3', the refrigerant pipe connecting the first heat exchanger 20 and the four-way valve 1000, 200 is referred to as a 'first heat exchanger refrigerant pipe 13', the refrigerant pipe connecting the second heat exchanger 40 and the four-way valve 1000, 200 is referred to as a 'second heat exchanger refrigerant pipe 43', and the refrigerant pipe connecting the accumulator 50 and the four-way valve 1000, 200 is referred to as an 'accumulator connecting pipe 53'.

The high-temperature and high-pressure refrigerant discharged from the compressor 1 is supplied into the four-way valve 1000, 200, and then is supplied to any one of the first heat exchanger refrigerant pipe 13 and the second heat exchanger refrigerant pipe 43 by the selective operation of the valve pad part described later. The refrigerant supplied to the first heat exchanger 20 or the second heat exchanger 40 completes a certain function of the refrigerant, and then is recovered to the inside of the four-way valves 1000, 2000 again and is supplied to the accumulator 50 through the accumulator connecting pipe 53.

More specifically, the vehicle is equipped with a Heating, Ventilating and Air Conditioning Module (HVAC module) 10 for cooling or heating the interior of the vehicle. The HVAC module may include the HVAC housing 60 in which a second heat exchanger 40, a PTC heater 62, and a blowing fan 61 are provided, the compressor 1, the first heat exchanger 20, the expansion valve 30, and the accumulator 50. Here, the expansion valve 30 may be provided inside the HVAC housing 60, or may be provided outside.

Figure 4:
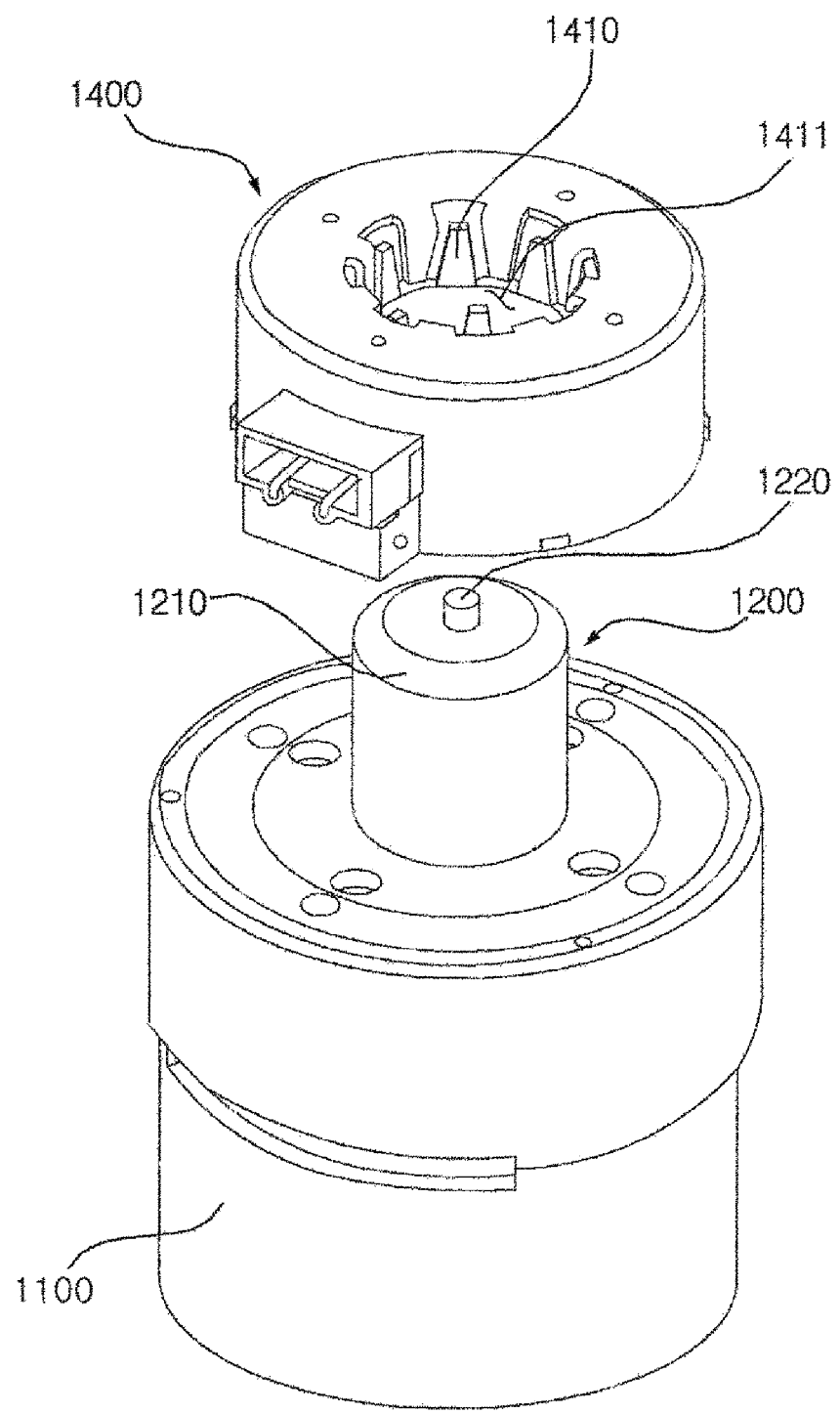
FIG. 4 is an exploded perspective view showing a state in which a case and cover among configurations of the four-way valve for switching the refrigerant flow path is separated according to an embodiment of the present invention.

FIG. 4 is an exploded perspective view showing a state in which a cover case 1400 among configurations of the four-way valve 1000 for switching the refrigerant flow path is separated according to an embodiment of the present invention.

Figure 5:
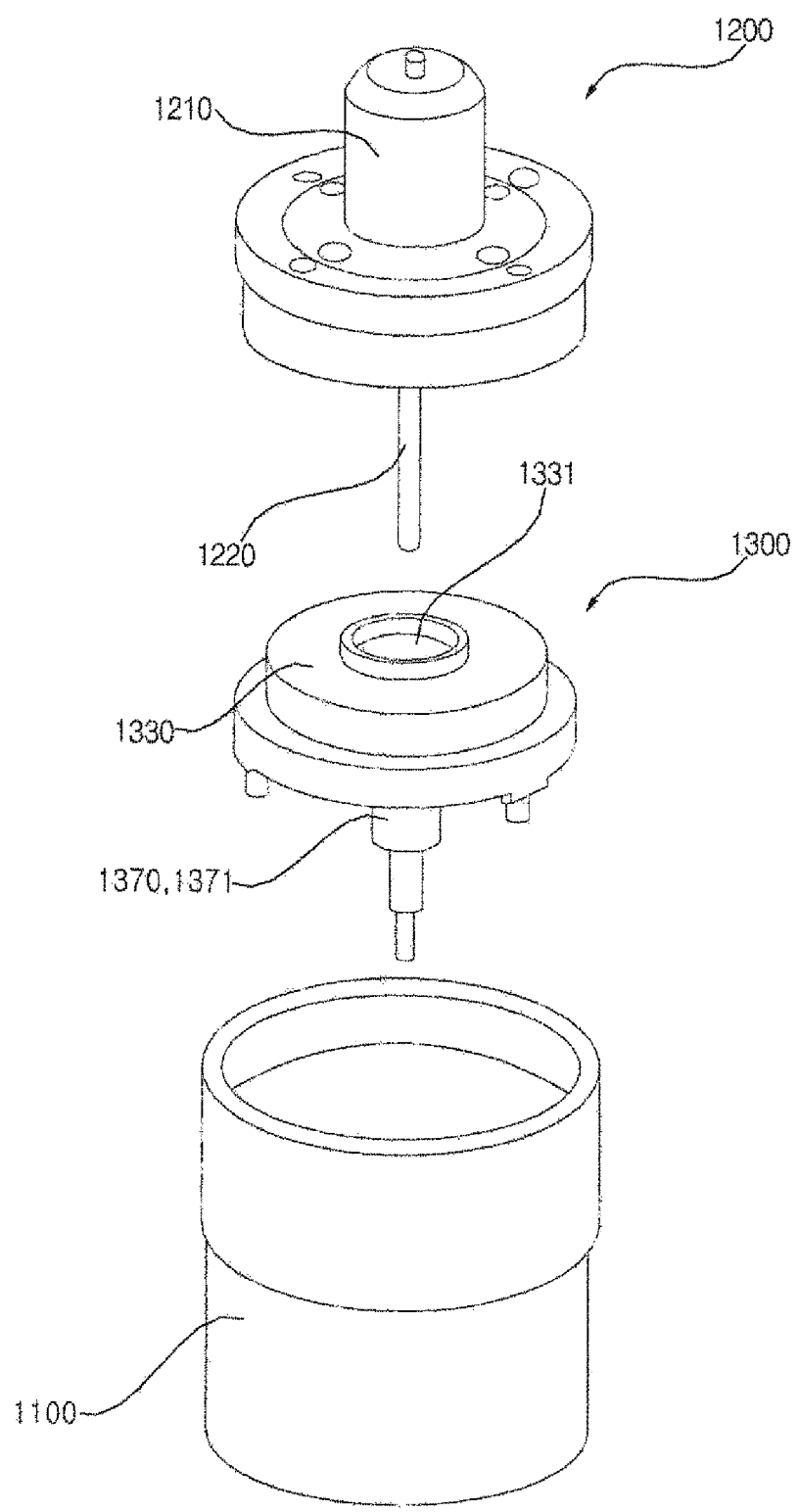
FIG. 5 is an exploded perspective view showing a state in which a rotation drive part and a deceleration part are separated among configurations of FIG. 4.

FIG. 5 is an exploded perspective view showing a state in which a rotation drive part 1200 and a deceleration part 1300 are separated among configurations of FIG. 4.

Figure 6:
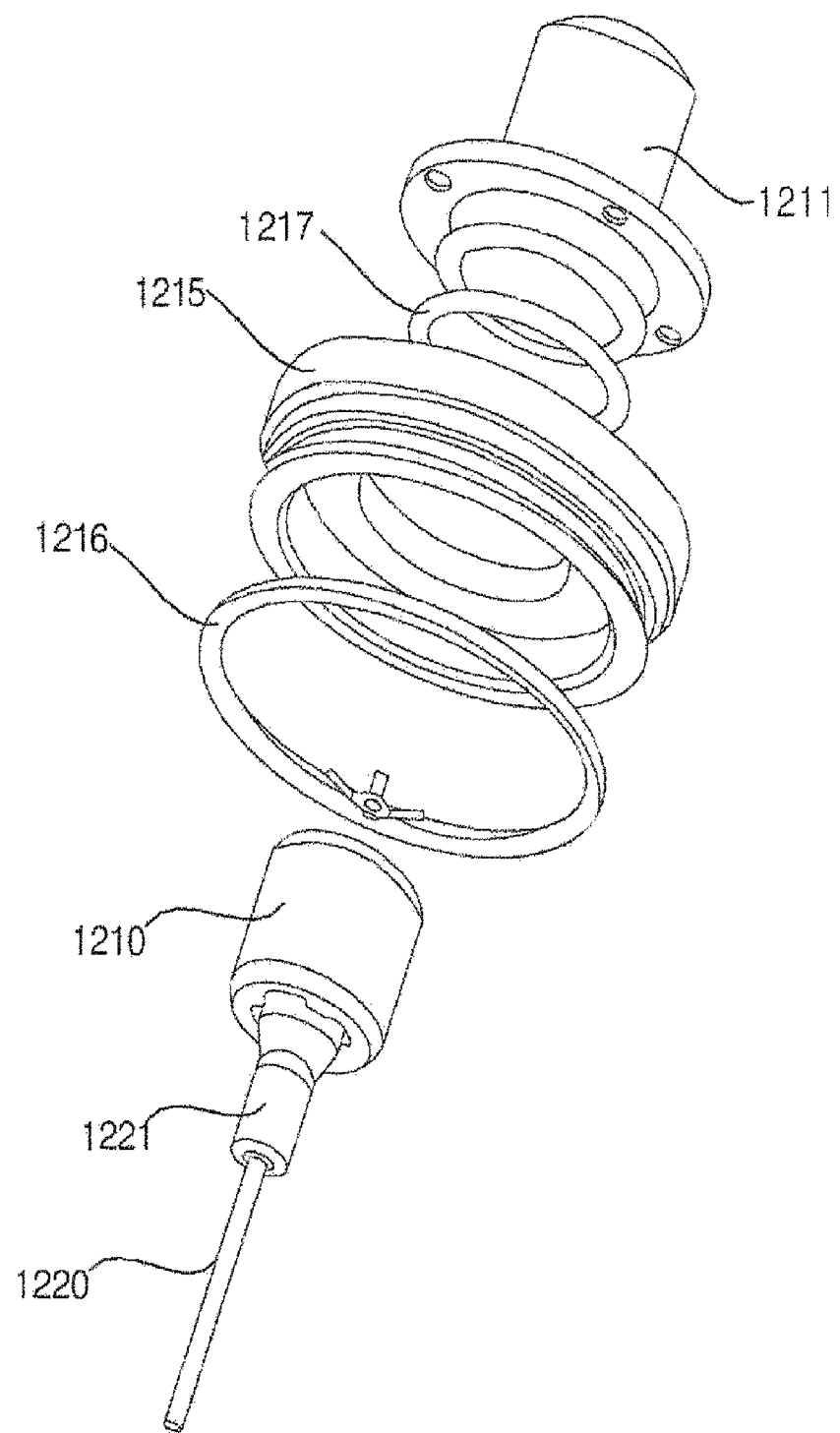
FIG. 6 is an exploded perspective view of an example of the rotation drive part among configurations of FIG. 4.

FIG. 6 is an exploded perspective view of an example of the rotation drive part 1200 among configurations of FIG. 4.

Figure 7:
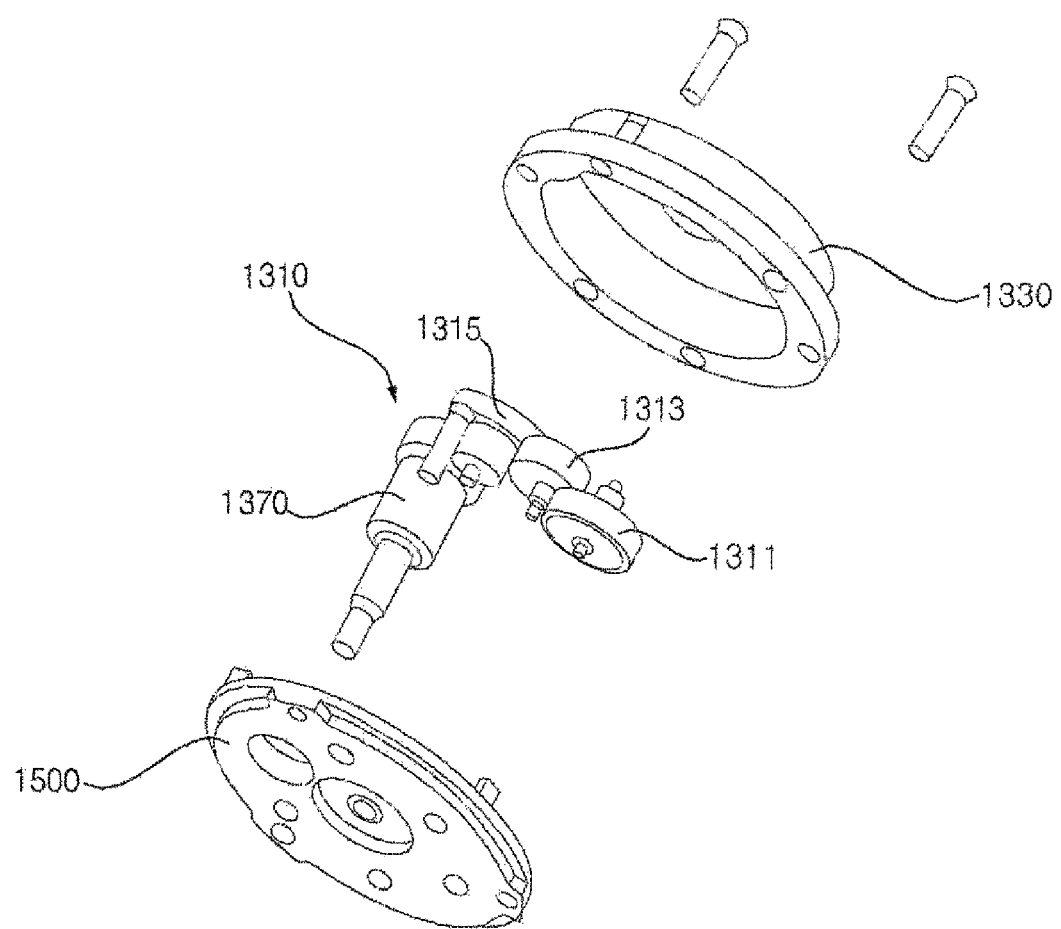
FIG. 7 is an exploded perspective view showing a deceleration part among configurations of FIG. 4.

FIG. 7 is an exploded perspective view showing a deceleration part among configurations of FIG. 4.

Figure 8:
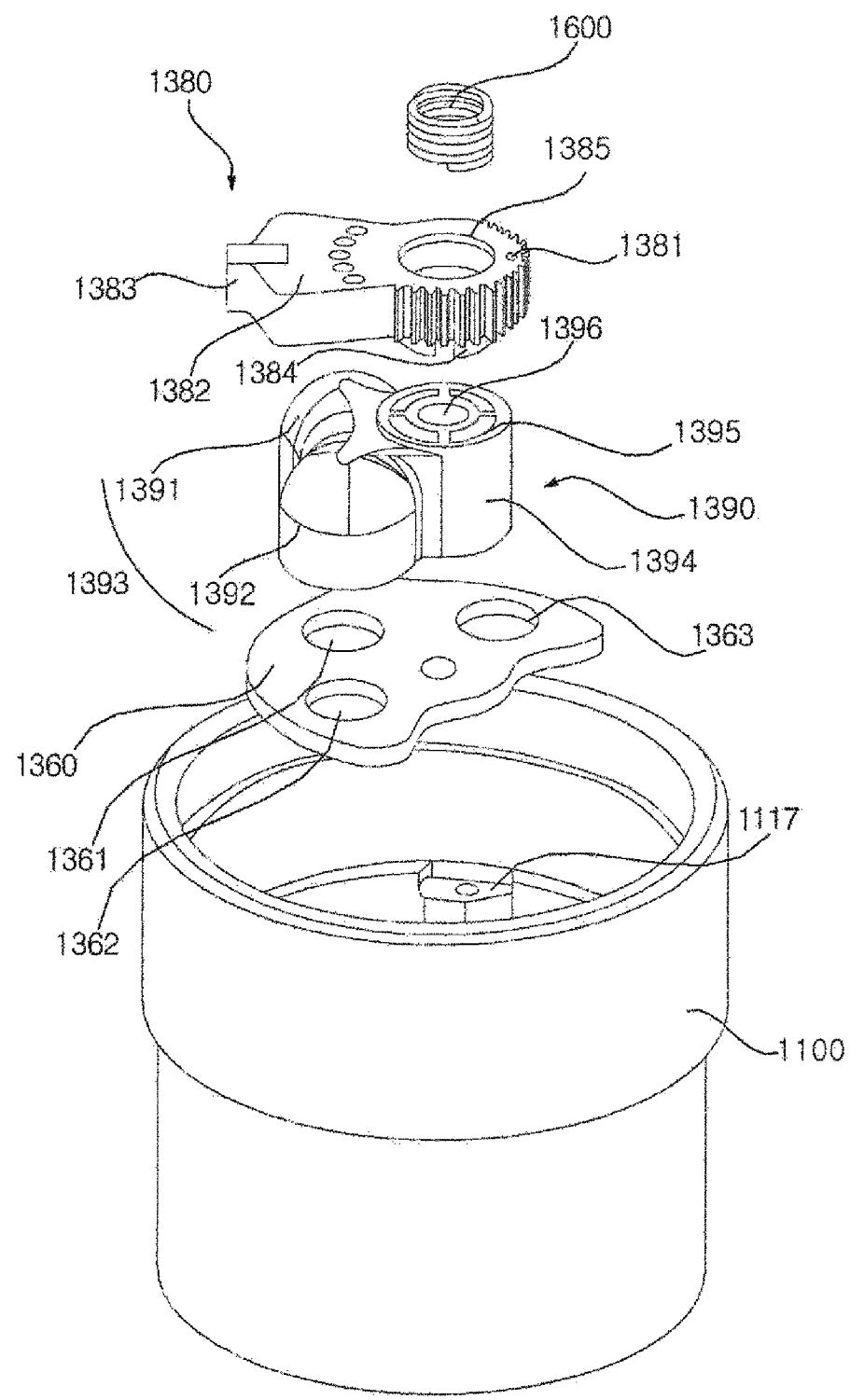
FIG. 8 is an exploded perspective view showing an output gear part and a valve pad part among configurations of FIG. 4.

FIG. 8 is an exploded perspective view showing an output gear part and a valve pad part among configurations of FIG. 4.

Referring to FIGS. 4 to 8, an embodiment of the four-way valve for switching the refrigerant flow path according to the present invention includes a housing part 1100 including a refrigerant filling chamber which is filled with a refrigerant, a valve plate 1360 disposed at one side of the housing part and having at least three inflow/outflow holes 1361, 1362, 1363 formed therein, and a valve pad part 1390 disposed in the refrigerant filling chamber, rotating to contact one of surfaces of the valve plate 1360, continuously occupying one (hereinafter, referred to as "first hole 1361") of the at least three inflow/outflow holes and selectively occupying one (hereinafter, referred to as "second hole 1362, 1363") of the at least three inflow/outflow holes excluding the first hole 1361 during rotation so as to make the occupied inflow/outflow holes communicate with each other, thereby forming a change flow path.

Here, the housing part 1100 may be formed in a substantially hollow cylindrical structure as shown in FIGS. 4 and 5, and the refrigerant filling chamber may be set to occupy a part of lower side of an internal space of the cylindrical structure.

The valve plate 1360 may be disposed to cross the refrigerant filling chamber to divide into two spaces (hereinafter, referred to as 'valve plate of a first embodiment'), or may be disposed to divide the refrigerant filling chamber into two spaces while the two divided spaces communicates with each other so as to allow the refrigerant to flow therebetween (hereinafter, referred to as a 'valve plate 1360 of a second embodiment'. see the valve plate of FIG. 8).

Here, in the case of the valve plate 1360 of the first embodiment, at least one communication hole may be further provided in addition to the above-described three inflow/outflow holes, so that the refrigerant filling chamber divided into two spaces may be configured to communicate with each other. The valve plate 1360 of the second embodiment may be provided with only above described three inflow/outflow holes 1361, 1362, and 1363. Hereinafter, assuming that the valve plate 1360 of the second embodiment is employed, the structure of the three inflow/outflow holes 1361, 1362, and 1363 will be described in detail.

The valve pad part 1390 is formed with two communication holes 1391 and 1392 which are opened toward one surface of the valve plate 1360 of the second embodiment, and the two communication holes 1391 and 1392 are mutually connected to have a structure in which the refrigerant introduced into one communication hole can be discharged to the other communication hole or the refrigerant introduced through the other communication hole can be discharged to the one communication hole.

It is preferable that the valve pad part 1390 is provided in such a manner that the two communication holes 1391 and 1392 are in close contact with any one surface of the valve plate 1360 based on two surfaces of the valve plate 1360 of the second embodiment. In an embodiment of the present invention, it is described on the assumption that the valve pad part 1390 is provided in such a manner that two communication holes 1391 and 1392 are in close contact with the upper surface of the valve plate 1360 of the second embodiment as shown in the drawing.

In the valve plate 1360 of the second embodiment, as described above, at least three inflow/outflow holes 1361, 1362, and 1363 may be formed. In addition, in the lower surface of the housing part 1100, a compressor pipe hole 1101, a first heat exchanger pipe hole 1102, a second heat exchanger pipe hole 1103, and an accumulator pipe hole 1104 to which the compressor discharge pipe 3, the first heat exchanger refrigerant pipe 13, the second heat exchanger refrigerant pipe 43, and the accumulator connecting pipe 53 are respectively connected are provided.

Here, the first hole 1361 formed in the valve plate 1360 (hereinafter, the valve plate of the second embodiment is collectively referred to as a 'valve plate') is related to the compressor discharge pipe 3 and may be defined as 'high pressure refrigerant inflow hole 1361', one 1362 of the second holes 1362 and 1363 formed in the valve plate 1360 is related to the first heat exchanger refrigerant pipe 13 and may be defined as 'first heat exchanger connecting hole 1362', and the other one 1363 of the second holes 1362 and 1363 formed in the valve plate 1360 is related to the second heat exchanger refrigerant pipe 43, and may be defined as 'second heat exchanger connecting hole 1363'.

The compressor pipe hole 1101 and the high-pressure refrigerant inflow hole 1361 are communicated with each other by a first connection port 1141 and are shielded from the refrigerant filling chamber, the first heat exchanger pipe hole 1102 and the first heat exchanger connecting hole 1362 are communicated with each other by a second connection port 1142 and are shielded from the refrigerant filling chamber, and the second heat exchanger pipe hole 1103 and the second heat exchanger connecting hole 1363 are communicated with each other by a third connection port 1143 and are shielded from the refrigerant filling chamber.

The two communication holes 1391 and 1392 of the valve pad part 1390 continuously occupy the first hole 1361 which is the high-pressure refrigerant inflow hole 1361 when the valve pad part 1390 is rotated to one side or rotated to the other side, occupy the first heat exchanger connecting hole 1362 among the second holes 1362 and 1363 simultaneously together with the first holes 1361 when the valve pad part 1390 is rotated to one side, and occupy the second heat exchanger connecting hole 1363 among the second holes 1362 and 1363 simultaneously together with the first holes 1361 when the valve pad part 1390 is rotated to the other side.

Here, when the two communication holes 1391 and 1392 of the valve pad part 1390 simultaneously occupy the first heat exchanger connecting hole 1362 among the first hole 1361 and the second hole 1362, 1363, the high temperature and high pressure refrigerant discharged from the compressor 1 flows into the valve pad part 1390 through the first connection port 1141 in a state of being shielded from the refrigerant filling chamber, and then the flow path of the refrigerant is switched so that the refrigerant is supplied to the first heat exchanger 20 through the first heat exchanger connecting hole 1362 and the second connection port 1142.

In addition, when the two communication holes 1391 and 1392 of the valve pad part 1390 simultaneously occupy the second heat exchanger connecting hole 1363 among the first hole 1361 and the second hole 1362, 1363, the high temperature and high pressure refrigerant discharged from the compressor 1 flows into the valve pad part 1390 through the first connection port 1141 in a state of being shielded from the refrigerant filling chamber, and then the flow path of the refrigerant is switched so that the refrigerant is supplied to the second heat exchanger 40 through the second heat exchanger connecting hole 1363 and a third connection port.

Referring to FIGS. 4 to 7, the four-way valve 1000 for switching a refrigerant flow path according to an embodiment of the present invention may further include a rotation drive part 1200 for transferring a driving force to rotate the valve pad part 1390, and a deceleration part 1300, disposed between the rotation drive part 1200 and the valve pad part 1390, for increasing a driving torque transferred from the rotation drive part 1200.

The rotation drive part 1200 may be a motor having a rotation shaft that is operated when power is input. Preferably, it may be a step motor having a rotation shaft which can be selectively rotated in one direction or the other direction, or may be a DC motor having a rotation shaft which is rotationally controlled only in one direction. Details thereof will be described later.

Meanwhile, the deceleration part 1300 may be implemented by a gear train including a plurality of gears 1311, 1313, and 1315 that receive driving force from the rotation drive part 1200 to output after changing a gear ratio.

A plurality of gear trains are installed in a mounting plate 1500 described later. In more detail, an embodiment of the four-way valve for switching the refrigerant flow path according to the present invention may further include a mounting plate 1500 which is disposed to partition a space (hereinafter, referred to as a 'drive part space') provided with the refrigerant filling chamber and the rotation drive part 1200 and in which the rotation shaft of the plurality of gears 1311, 1313, and 1315 is rotatably supported.

Here, as described above, the mounting plate 1500 serves to partition the drive part space and the refrigerant filling chamber, and at the same time, serves to provide a mounting part so that a plurality of gears 1311, 1313, and 1315 constituting the above-described gear train installed on the upper and lower sides with respect to the mounting plate 1500 as shown in drawing can be rotatably supported.

Referring to FIGS. 5 and 7, the gear train may include an input gear part 1310 that is disposed in the drive part space partitioned with respect to the mounting plate 1500 and receives a driving force from the rotation drive part 1200.

The gear train may include an output gear part 1380 that is disposed in the refrigerant filling chamber with respect to the mounting plate 1500 and rotates the valve pad part 1390 at a rotational speed of a changed gear ratio.

The gear train may include a transmission gear part 1370 that is disposed to penetrate through the mounting plate 1500 and to be engaged with the input gear part 1310 while being engaged with the output gear part 1380.

Referring to FIG. 6, the rotation drive part 1200 includes a rotation shaft 1220 coupled to a rotor 1210 and rotated together therewith, and extending toward the refrigerant filling chamber.

Figure 9:
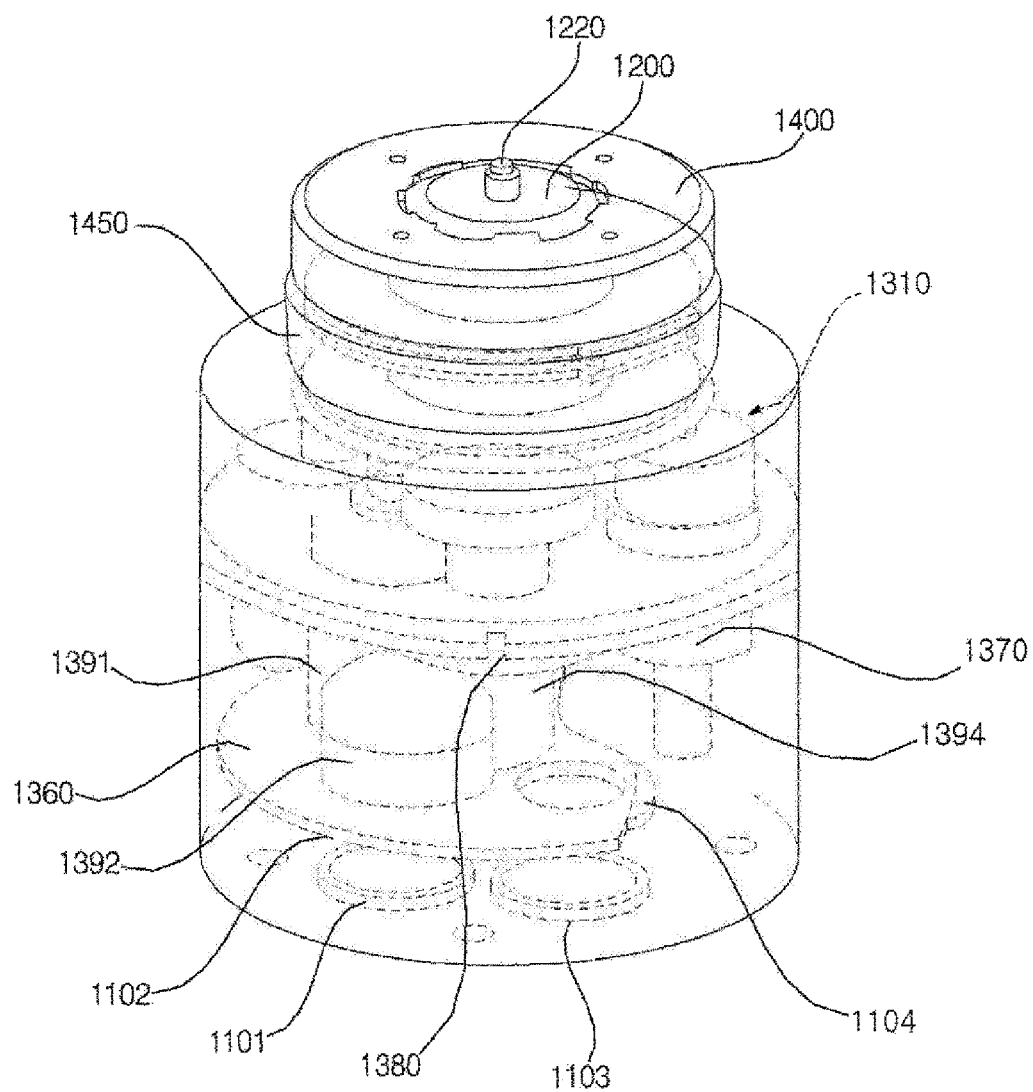
FIG. 9 is a projection perspective view showing an internal structure of a four-way valve for switching a refrigerant flow path according to an embodiment of the present invention.

FIG. 9 is a projection perspective view showing an internal structure of a four-way valve for switching a refrigerant flow path according to an embodiment of the present invention.

Figure 10:
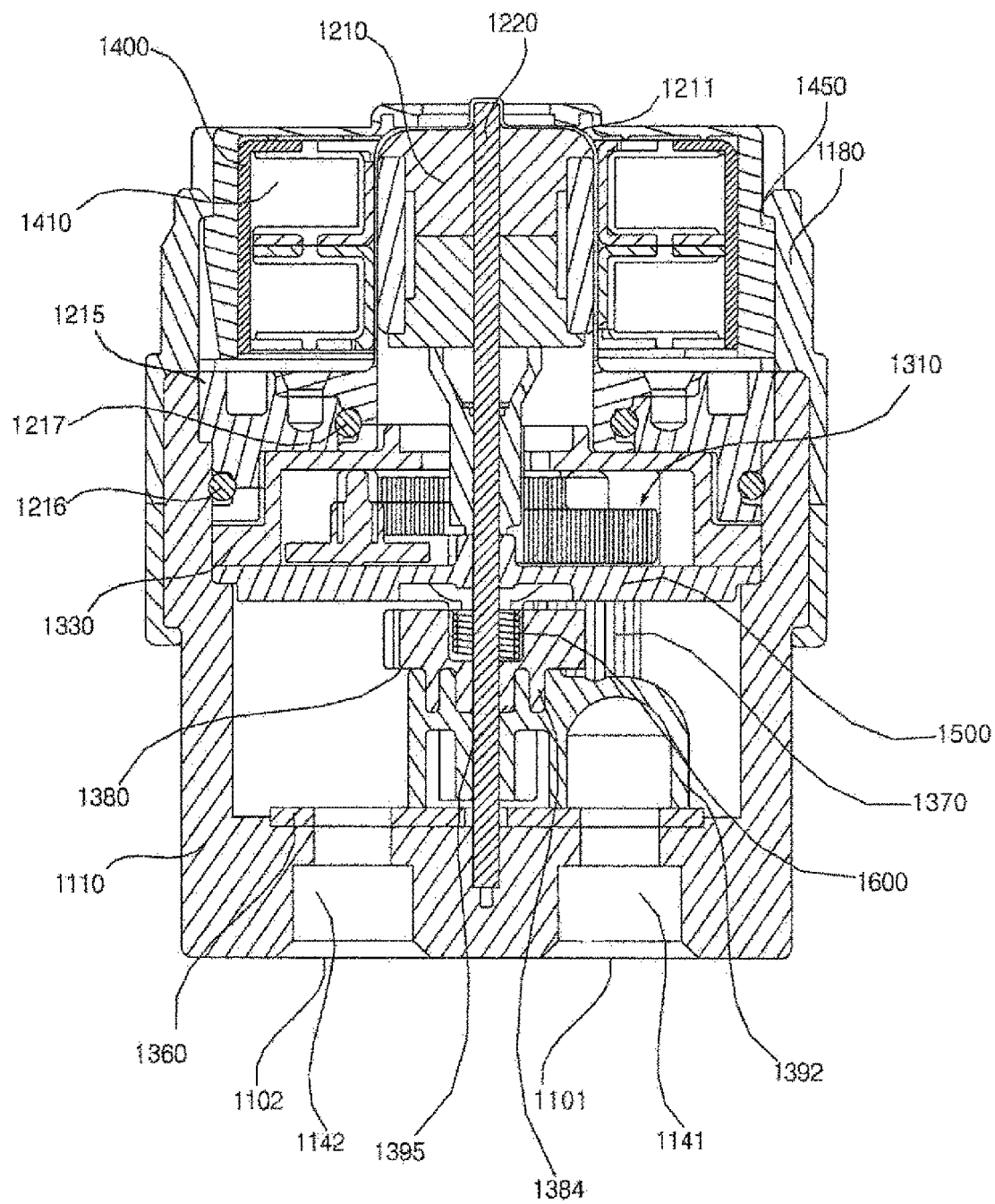
FIG. 10 is a cross-sectional view taken along a plane crossing the rotation shaft of the rotation drive part in FIG. 9.

FIG. 10 is a cross-sectional view taken along a plane crossing the rotation shaft of the rotation drive part in FIG. 9.

Referring to FIG. 10, in the rotation drive unit 1200, the upper end of the rotation shaft 1220 is disposed above the mounting plate 1500, penetrates the mounting plate 1500 and also passes through the valve pad part 1390 located at the lower portion thereof and is disposed to be relatively rotated with respect to the valve pad part 1390, and may be rotatably supported by the valve plate 1360 positioned in the lower portion thereof.

A pinion gear 1221 is provided on the outer circumferential surface of the rotation shaft 1220 located in the drive part space to rotate in conjunction with the rotation shaft 1220. The pinion gear 1221 is engaged with any one gear of the input gear part 1310 that is a combination of a plurality of pinion gears, and serves to change the driving force of the rotation drive part 1200 with a certain gear ratio and transmit.

The input gear part 1310 may be formed of a combination of a plurality of gears 1311, 1313, and 1315, as shown in FIGS. 7 and 10. That is, the input gear part 1310 may include a first input gear 1311 that is directly engaged with the pinion gear 1221, provided on the outer circumferential surface of the rotation shaft 1220, to change a gear ratio to a first change gear ratio and receives a driving force, a second input gear 1313 that is engaged with the first input gear 1311 to change a gear ratio to a second change gear ratio and transmits the driving force, and a third input gear 1315 engaged with the second input gear 1313 to change a gear ratio to a second change gear ratio and transmits the driving force to the transmission gear part 1370.

The driving force inputted from the pinion gear 1221 of the rotation shaft 1220 amplifies the driving force of the rotor 1210 by a gear ratio that is changed three times while being sequentially engaged with the first input gear 1311, the second input gear 1313, and the third input gear 1315 as described above and being rotated, thereby increasing the driving torque of the valve pad part 1390.

Here, the first to third input gears 1311, 1313, and 1315 may implemented by a two-stage pinion gear provided with a sub-gear having a relatively small diameter provided in an upper part or a lower part of a main gear having a relatively large diameter and may be designed in such a manner that the gear ratio can be appropriately changed so as to form a driving torque that should be provided by the valve pad part 1390.

Meanwhile, as shown in FIGS. 7 and 10, as in the case of the input gear part 1310, in the transmission gear part 1370, a portion which engages with the sub gear of the third input gear 1315 may be implemented by a main gear having a relatively large diameter, and a portion engaged with the output gear portion 1380 described later may be implemented by a sub gear having a relatively smaller diameter than the main gear.

The main gear of the input gear part 1310 and the transmission gear part 1370 may be disposed inside a deceleration part housing 1330, as shown in FIGS. 7 and 10.

The specific disposition relationship of the deceleration part housing 1330 will be described later.

Meanwhile, as shown in FIG. 9, the output gear part 1380 and the valve pad part 1390 may be provided to be interlocked with the valve pad part 1390 when the output gear part 1380 receives the driving force from the input gear part 1310.

To this end, as shown in FIG. 8, the valve pad part 1390 may include a coupling part 1394 that is connected to the output gear part 1380, and a switching part 1393 that communicates the first hole 1361 and the second hole 1362, 1363 to switch the flow direction of the refrigerant, when rotated in conjunction with the output gear part 1380.

Here, the coupling part 1394 is provided with a shaft through hole 1396 through which the rotation shaft 1220 penetrates, and a plurality of coupling grooves 1395 formed by annular grooving around the shaft through hole 1396. The plurality of coupling grooves 1395 do not form a complete annular shape, but may be formed in such a manner that four coupling grooves 1395 are substantially annular, as shown in FIG. 8.

In addition, as shown in FIG. 8, the output gear part 1380 may include a plurality of coupling ribs 1360 inserted into and engaged with the plurality of coupling grooves 1395 provided in the coupling part 1394 of the output gear part 1380. A plurality of coupling grooves 1395 are respectively provided to be opened upward in the drawing, and a plurality of coupling ribs 1384 are coupled to be inserted from the upper side to the lower side of the plurality of coupling grooves 1395 opened upward.

If the plurality of coupling ribs 1384 are completely inserted into the plurality of coupling grooves 1395, when the output gear part 1380 is rotated due to engagement with the transmission gear part 1370, the valve pad part 1390 may also be rotated around the rotation shaft 1220 of the rotation drive part 1200.

In addition, as shown in FIG. 8, the output gear part 1380 may include a shaft through hole 1385 through which the rotation shaft 1220 penetrates, a partial gear teeth 1381 formed in a pinion gear shape so that a part thereof is engaged with the transmission gear part 1370, and a stopper end 1382 extended to prevent over-rotation of the valve pad part 1390 due to interference with one side of the rotation direction of the output gear part 1380 and interference with the other side of the rotation direction of the output gear part 1380 in the inner side of the housing part 1100.

The partial gear teeth 1381 are formed in an annular shape at one end of the output gear part 1380, and the stopper end 1382 is extended outwardly at the other end part of the output gear part 1380 opposed to the partial gear teeth 1381.

Figure 11A:
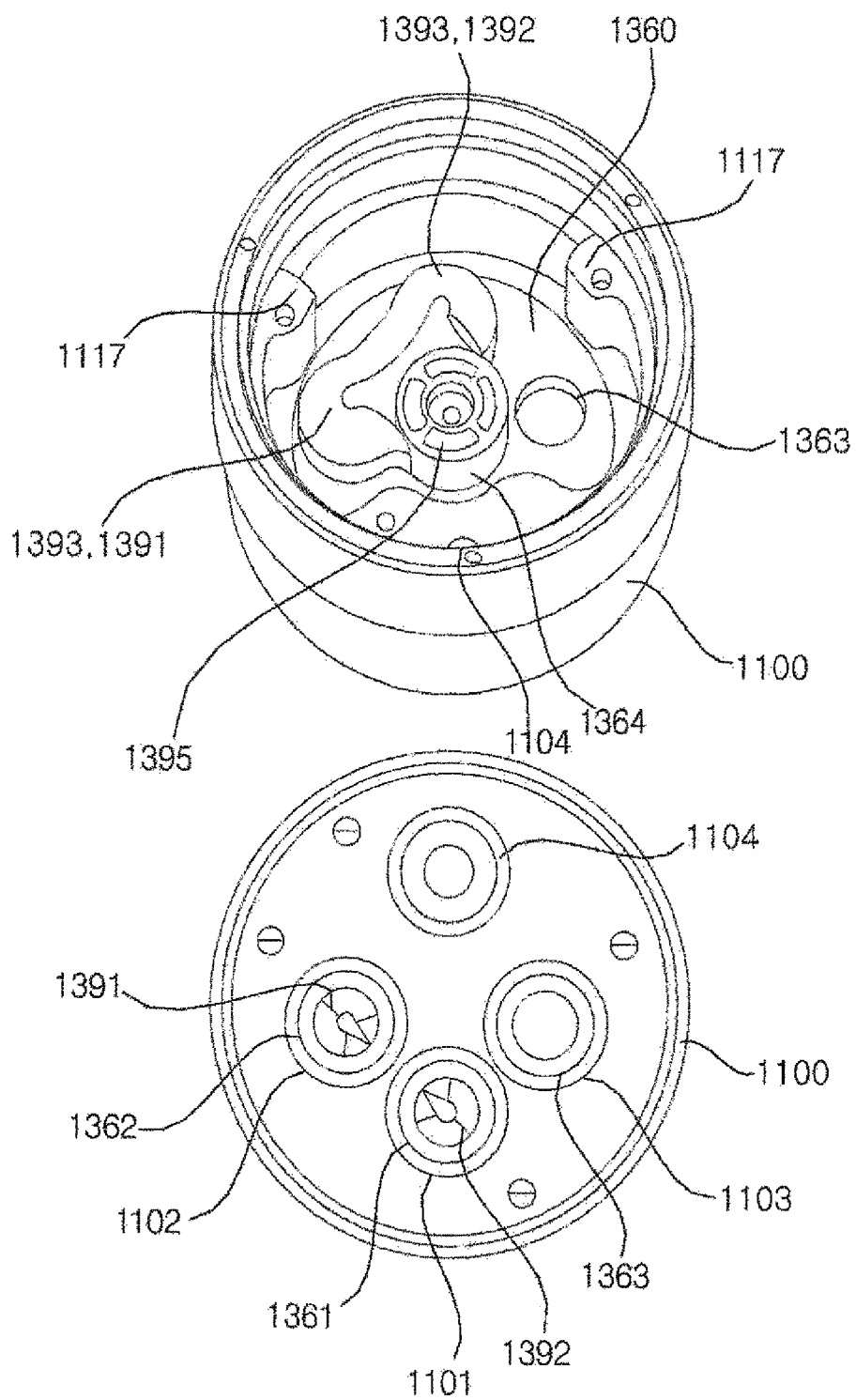
FIG. 11A and FIG. 11B are a perspective view and a bottom view showing the operation relation of a valve pad part.
Figure 11B:
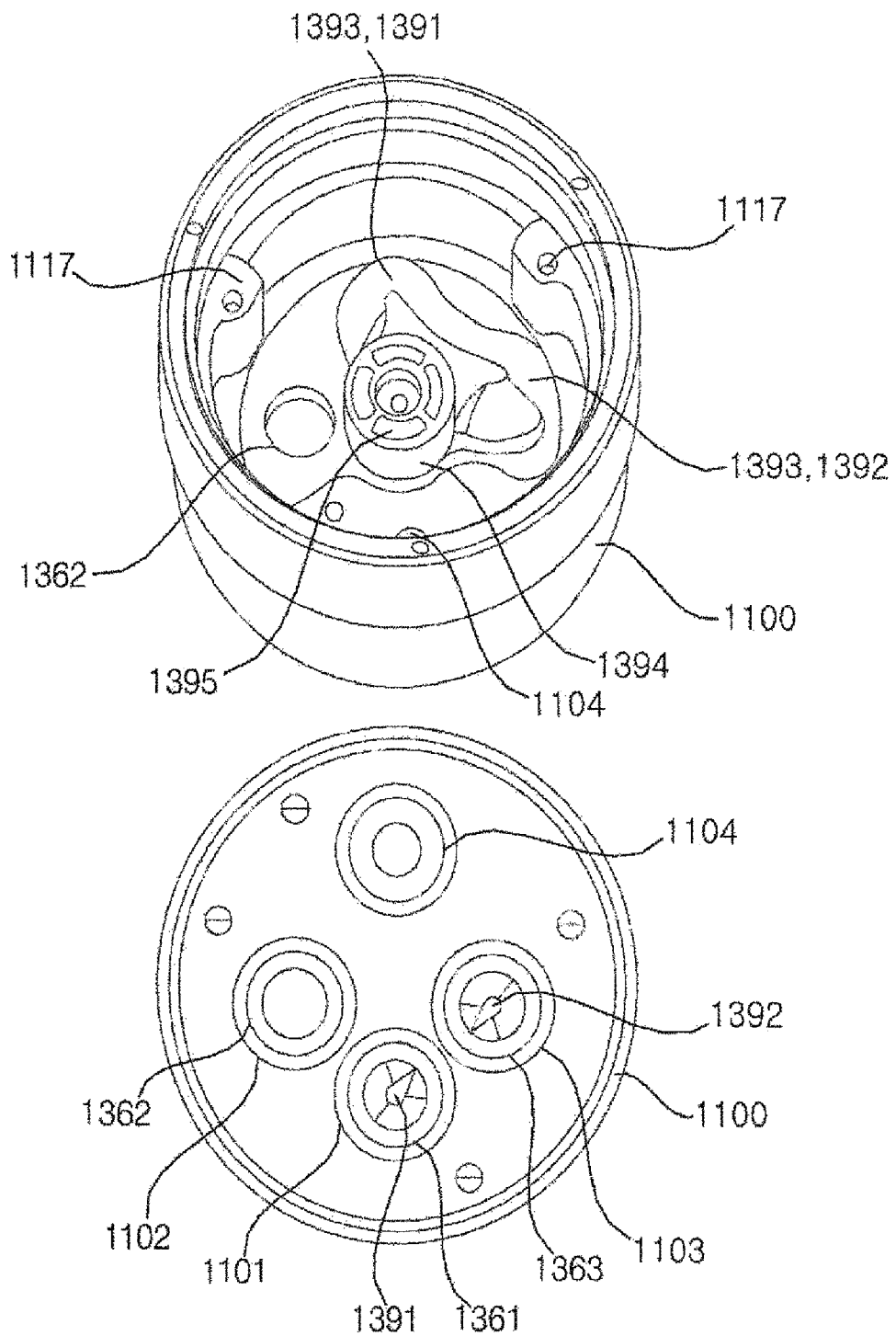

FIG. 11A and FIG. 11B are a perspective view and a bottom view showing the operation relation of a valve pad part.

Figure 12:
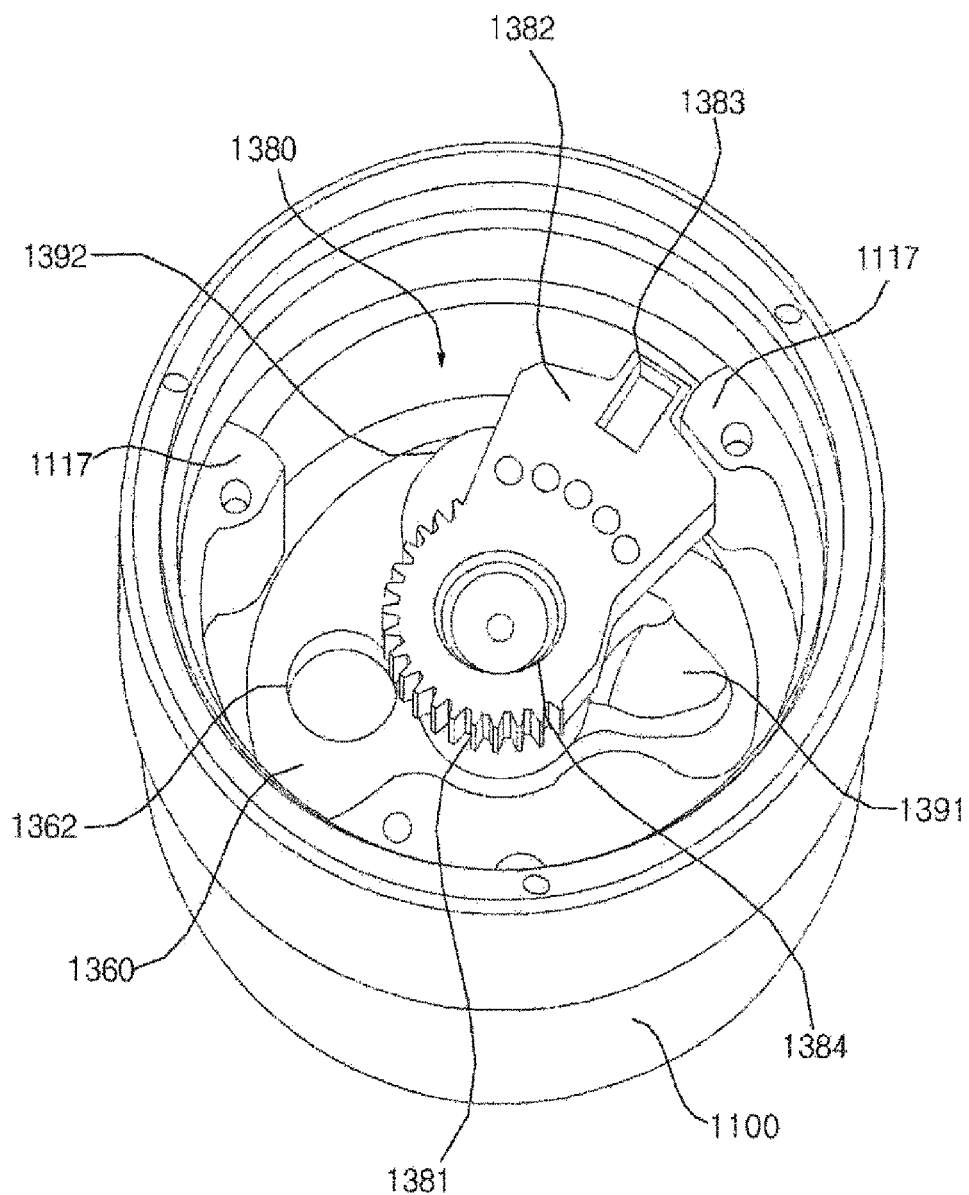
FIG. 12 is a perspective view showing a rotation limiting configuration of the valve pad part among configurations of FIG. 10.

FIG. 12 is a perspective view showing a rotation limiting configuration of the valve pad part among configurations of FIG. 10.

Referring to FIGS. 11A, 11B and 12, inside the housing part 1100, a contact end part 1117 formed to protrude inward to interfere with the stopper end 1382 formed at the other end of the output gear part 1380 may be provided. Each of the contact end parts 1117 may be provided in one side and the other side of the inside of the housing part 1100 respectively.

When receiving the rotational force transmitted from the rotation drive part 1200 through the input gear part 1310 and the transmission gear part 1370 in a changed gear ratio, the output gear part 1380 is rotated about the rotation shaft 1220 toward one side or the other side. At this time, the one side rotation limiting position of the output gear part 1380 is a position where the two communication holes 1391 and 1392 of the valve pad part 1390 stably occupy the first heat exchanger connecting hole 1362 among the high pressure refrigerant inflow hole 1361 which is the first holes 1361 formed in the valve plate 1360 and the second hole 1362 and 1363, due to the interlocking rotation of the valve pad part 1390 with the output gear part 1380. The other side rotation limiting position of the output gear part 1380 may be set to a position where the two communication holes 1391 and 1392 of the valve pad part 1390 stably occupy the second heat exchanger connecting hole 1363 among the high pressure refrigerant inflow hole 1361 which is the first holes 1361 formed in the valve plate 1360 and the second hole 1362 and 1363, due to the interlocking rotation of the valve pad part 1390 with the output gear part 1380.

The contact end part 1117 is preferably made of a rubber material so as to prevent friction noise with a protruding end 1383 of the hard material formed at the stopper end 1382 of the output gear part 1380. More preferably, a noise prevention pad not shown may be adhered to the surface of the protruding end 1383 of the stopper end 1382. However, since this is a part directly in contact with the refrigerant, its availability may be selected in consideration of the chemical action with the refrigerant.

Meanwhile, the stopper end 1382 is provided with a magnet for sensing the origin when the output gear 1380 rotates, and a Hall IC sensor (not shown) for generating a certain signal due to interaction with the magnet may be provided in the housing part 1100 corresponding to a position where the origin of the output gear part 1380 is sensed. Here, the Hall IC sensor is adopted as a sensing component for sensing the origin of the output gear part 1380, but any component can be adopted as long as the sensor has the origin depending on the embodiment.

Referring to FIGS. 4, 9, and 10, in the four-way valve 1000 for switching a refrigerant flow path according to an embodiment of the present invention, a housing part 1100 is provided in such a manner that a side in which the rotation drive part 1200 is installed is open, and a cover case 1400 covering the housing part 1100 that is opened so that the rotation drive part 1200 can be embedded may be further included.

As shown in FIGS. 4 and 6, the rotation drive part 1200 includes a motor composed of the rotor 1210 that can be rotated inside a stator 1410 when power is supplied thereto. The rotor 1210 is provided with the rotation shaft 1220. The pinion gear 1221 may be provided on the outer circumferential surface of the rotation shaft 1220 located at the lower end of the rotor 1210 so as to engage with the input gear part 1310 of the deceleration part 1300.

Meanwhile, as shown in FIGS. 7 and 10, the deceleration part 1300 may include the input gear part 1310 provided in the drive part space and the deceleration part housing 1330 to cover the upper end of the transmission gear part 1370.

The deceleration housing 1330 may be provided with a gear accommodating part (no numeral in the drawing) having a lower end to accommodate the upper end of the input gear part 1310 and the transmission gear part 1370.

However, the deceleration part housing 1330 is not necessarily provided, and it is sufficient that the upper end portions of the input gear part 1310 and the transmission gear part 1370 are provided without providing the deceleration part housing 1330 on the premise that the refrigerant in the refrigerant filling chamber, which is a refrigerant filling space, is sealed by the mounting plate 1500 so that it is not introduced into the drive part space.

In the upper central area of the cover case 1400, a rotation shaft through hole 1411 through which the rotation shaft 1220 of the rotation drive part 1200 passes may be formed.

In addition, in the embodiment of the four-way valve for switching the refrigerant flow path according to the present invention, as shown in FIG. 10, the above-described stator 1410 is provided at the upper end portion of the cover case 1400, and the lower end portion 1450 of the cover case 1400 is provided such that a part of the bottom surface edge thereof is in contact with a part of the upper surface edge of the housing part 1100. At least one O-ring is provided to be interposed between the housing part 1100 and the opposed surface corresponding to the outside of the refrigerant filling chamber among the opposed surfaces of the cover case 1400, thereby preventing the refrigerant from leaking out.

Meanwhile, as shown in FIG. 11A, the four-way valve 1000 for switching the refrigerant flow path according to the embodiment of the present invention may further include at least one inflow/outflow hole 1104 (hereinafter, referred to as 'third hole 1104' to distinguish from 'first hole 1361' and 'second hole 1362, 1363') formed to penetrate the bottom surface of the housing part 1100.

As shown in FIG. 8, when only the high pressure refrigerant inflow hole 1361 that is the first hole 1361 and the first heat exchanger connecting hole 1362 and the second heat exchanger connecting hole 1363 corresponding to the second hole 1362, 1363 are formed in the valve plate 1360, and formed in an eccentric shape rather than a circular shape, the third hole 1104 may be provided such that the refrigerant filled in the refrigerant filling chamber is discharged immediately. That is, the third hole 1104 is configured not to require a separate connection port.

The accumulator connecting pipe 53 is connected to the outer surface of the housing part 1100 corresponding to the outside of the third hole 1104. Thus, the third hole may be defined as a low-pressure refrigerant discharge hole 1104 in that the third hole is communicated with the accumulator connecting pipe 53 and is a path through which low-pressure refrigerant discharged from the connecting hole, among the first heat exchanger connecting hole 1362 and the second heat exchanger connecting hole 1363, that is not occupied by two communication holes 1391, 1392 of the valve pad part 1390 is supplied to the accumulator 50.

The refrigerant flow path switching according to the preferred embodiment of the four-way valve for switching the refrigerant flow path according to the present invention will be briefly described with reference to the accompanying drawings.

A heat exchanger provided outside the HVAC housing 60 is referred to as a first heat exchanger 20, and a heat exchanger provided inside the HVAC housing 60 is referred to as a second heat exchanger 40.

First, when the vehicle air conditioner is operated in the cooling mode, as shown in FIGS. 1A and 11A, the compressor 1 is operated and the high-temperature and high-pressure refrigerant is discharged into the housing part 1100. At this time, the valve pad part 1390 is driven to occupy the high-pressure refrigerant inflow hole 1361 and the first heat exchanger connecting hole 1362, the high-pressure refrigerant discharged from the compressor 1 flows into the valve pad part 1390 through the high-pressure refrigerant inflow hole 1361, and then is discharged to the first heat exchanger 20 through the first heat exchanger connecting hole 1362 and condensed, and then is evaporated in the second heat exchanger 40, and then flows into the refrigerant filling chamber again through the second heat exchanger connecting hole 1363, and then is recovered to the accumulator 50 through the low-pressure refrigerant discharge hole 1104.

On the other hand, when the vehicle air conditioner is operated in the heating mode, as shown in FIGS. 1B and 11B, the compressor 1 is operated and the high-temperature and high-pressure refrigerant is discharged into the housing part 1100. At this time, the valve pad part 1390 is driven to occupy the high-pressure refrigerant inflow hole 1361 and the second heat exchanger connecting hole 1363, the high-pressure refrigerant discharged from the compressor 1 flows into the valve pad part 1390 through the high-pressure refrigerant inflow hole 1361, and then is discharged to the second heat exchanger 40 through the second heat exchanger connecting hole 1363 and condensed, and then is evaporated in the second heat exchanger 40, and then flows into the refrigerant filling chamber again through the first heat exchanger connecting hole 1362, and then is recovered to the accumulator 50 through the low-pressure refrigerant discharge hole 1104.

According to an embodiment of the four-way valve for switching the refrigerant flow path according to the present invention, even when the high temperature and high pressure refrigerant is discharged to the inside of the housing part 1100, since the driving force from the rotation drive part 1200 is decelerated by the deceleration part 1300 at a certain deceleration ratio, the valve pad part 1390 is rotated in such a manner that a higher driving torque is generated to sufficiently overcome the frictional force generated during rotation of the valve pad part 1390, thereby enhancing the performance of the product.

Hereinafter, a four-way valve 2000 for switching a refrigerant flow path according to another embodiment of the present invention will be described in detail with reference to the drawings. Here, the description of the same parts as the four-way valve 1000 for switching the refrigerant flow path according to an embodiment of the present invention will be omitted, and the other parts will be mainly described.

Figure 13:
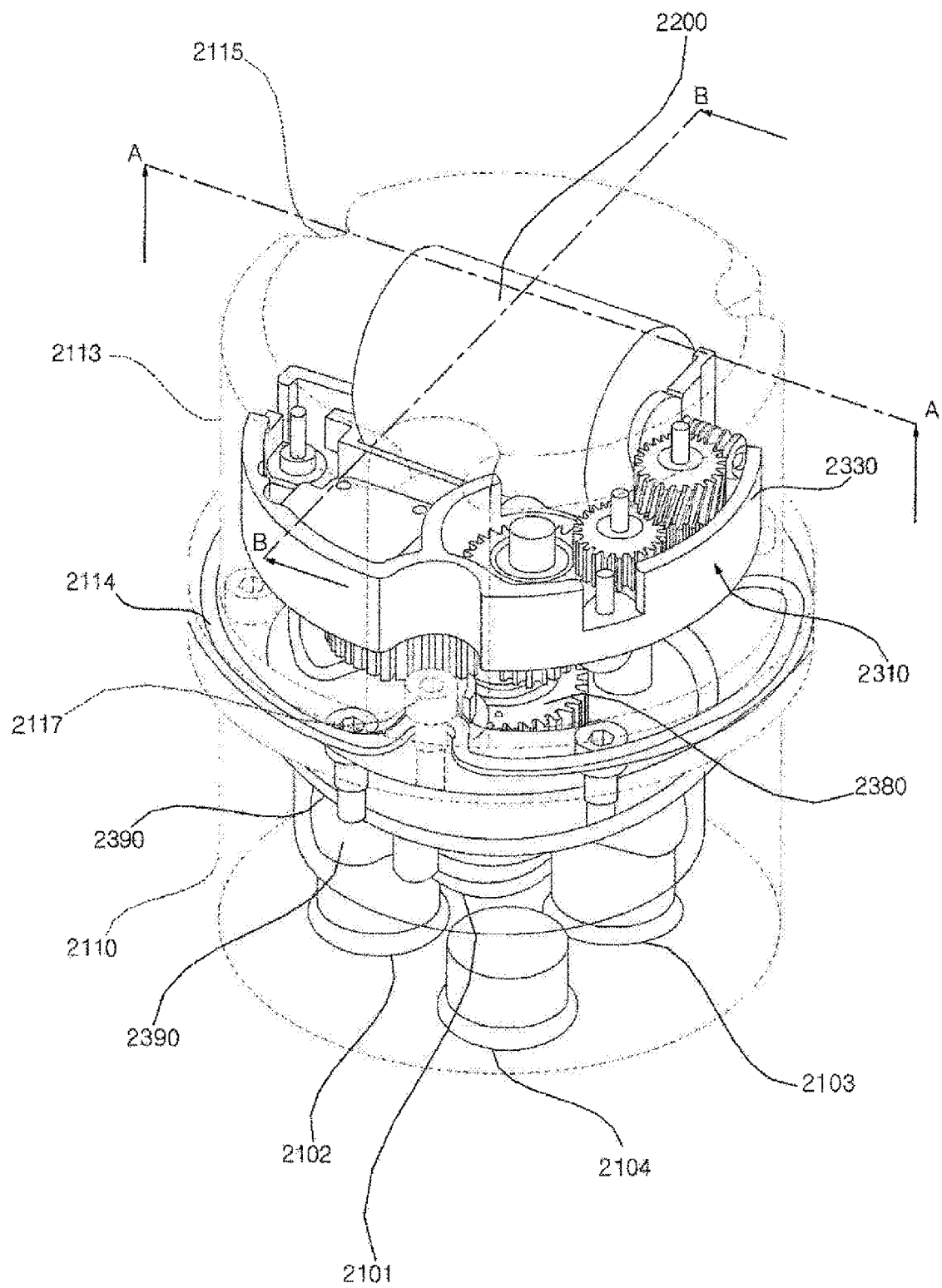
FIG. 13 is a projection perspective view showing an internal structure of a four-way valve for switching a refrigerant flow path according to another embodiment of the present invention.

FIG. 13 is a projection perspective view showing an internal structure of a four-way valve for switching a refrigerant flow path according to another embodiment of the present invention.

Figure 14:
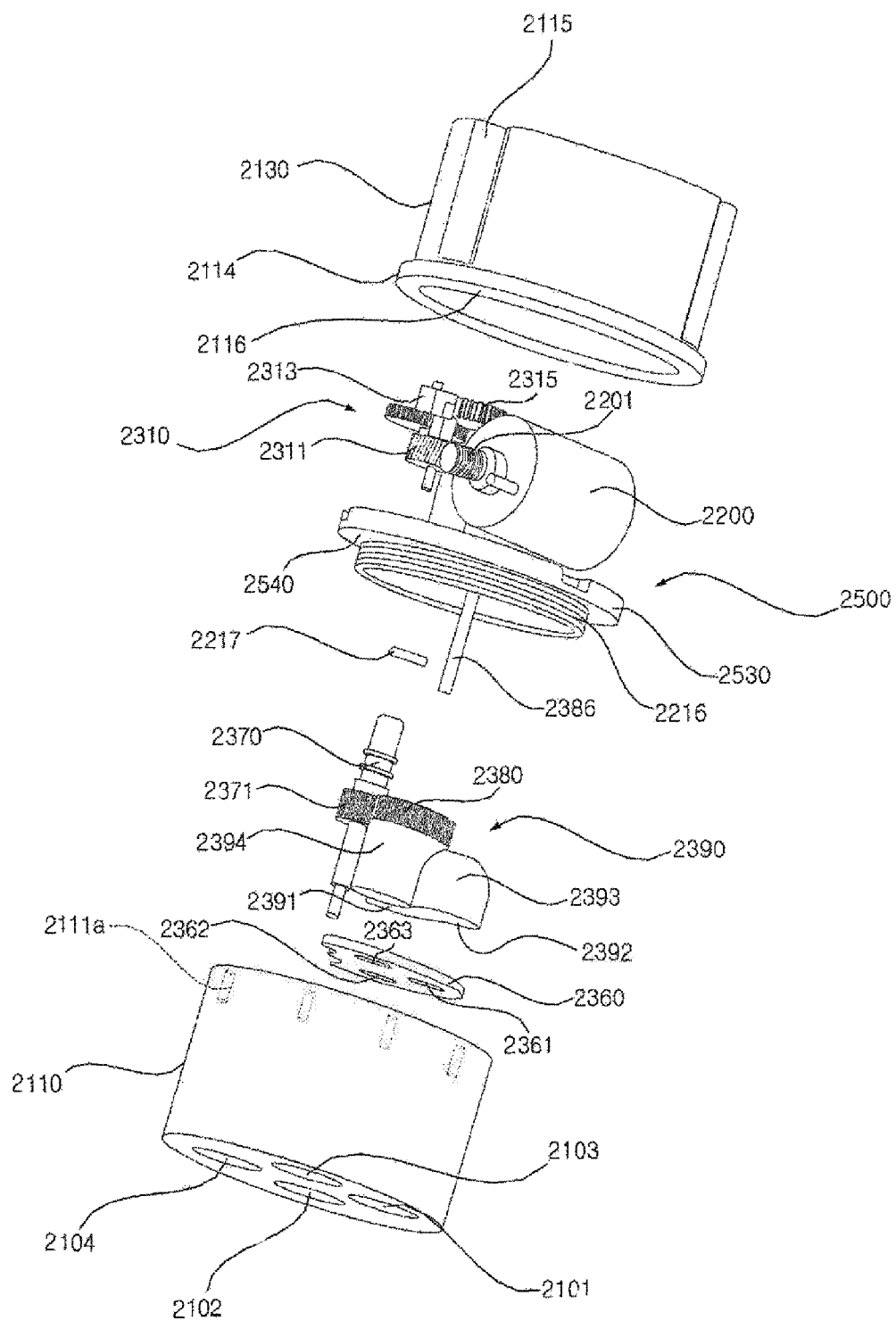
FIG. 14 is an exploded perspective view of FIG. 13.

FIG. 14 is an exploded perspective view of FIG. 13.

Figure 15:
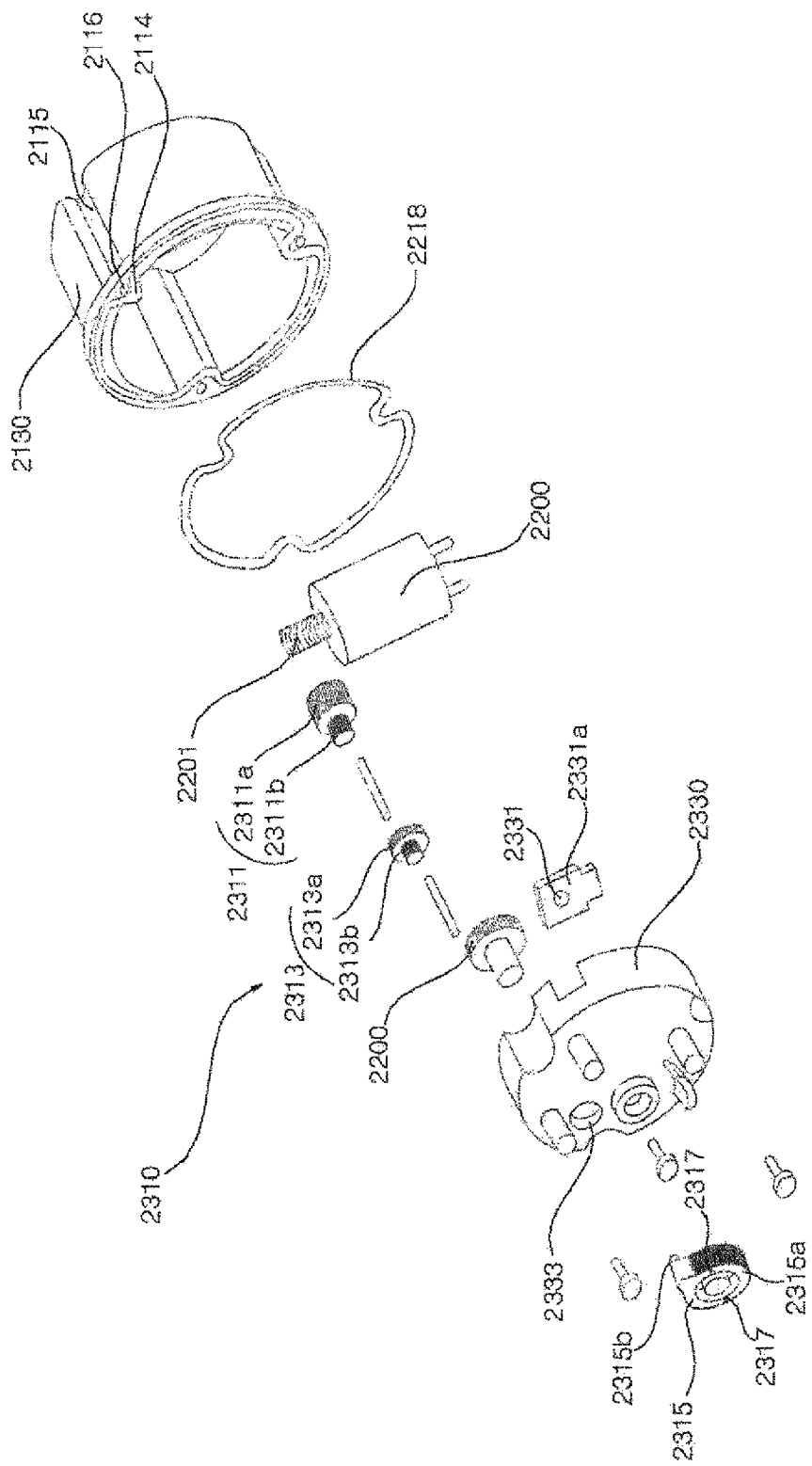
FIG. 15 is an exploded perspective view of a component of the drive part space side among configurations of FIG. 13.

FIG. 15 is an exploded perspective view of a component of the drive part space side among configurations of FIG. 13.

Figure 16:
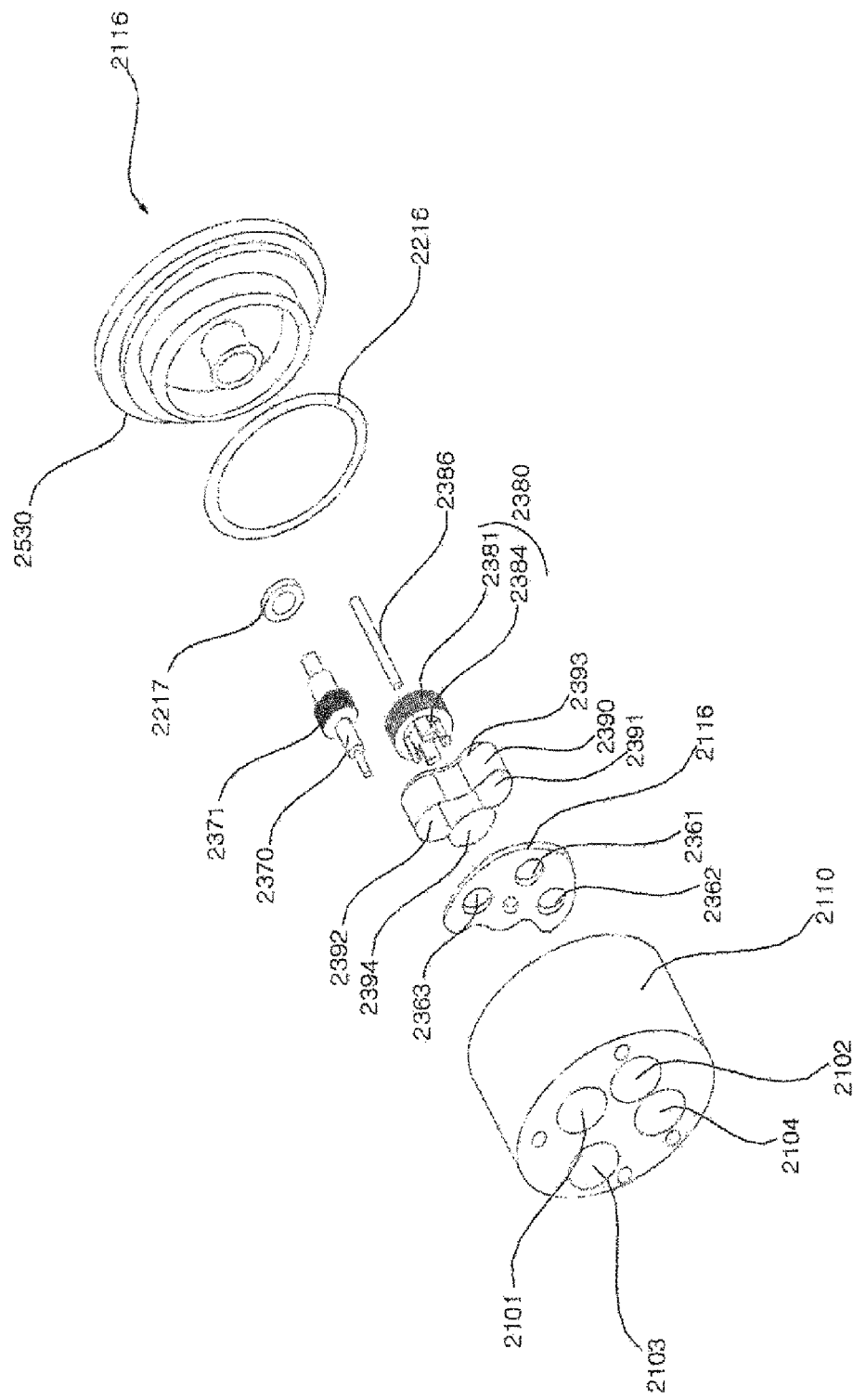
FIG. 16 is an exploded perspective view in which a component of the refrigerant filling chamber side is disassembled among configurations of FIG. 13.

FIG. 16 is an exploded perspective view in which a component of the refrigerant filling chamber side is disassembled among configurations of FIG. 13.

Referring to FIGS. 13 to 16, the four-way valve 2000 includes a housing part 2100 including a refrigerant filling chamber which is filled with a refrigerant, a valve plate 2360 disposed at one side of the housing part 2100 and having at least three inflow/outflow holes 2361, 2362, 2363 formed therein, and a valve pad part 2390 disposed in the refrigerant filling chamber, and forming a changed flow path of refrigerant while rotating in one direction or the other direction to contact one of surfaces of the valve plate 2360.

Here, the housing part 2100 may include a first housing 2110 having one side opened and having the above-described refrigerant filling chamber, and a second housing 2130 coupled to be in contact with the opened one side of the first housing 2110, and having a drive part space provided therein.

More specifically, in the housing part 2100, as shown in FIG. 13, the inside formed by the first housing 2110 and the second housing 2130 may be formed in a substantially hollow cylindrical structure, and the above-described refrigerant filling chamber may be defined as an inner space formed by the first housing 2110 of the housing part 2100 having a cylindrical structure.

Here, on the other closed side surface of the first housing 2110 of the housing part 2100, a compressor pipe hole 2101, a first heat exchanger pipe hole 2102, a second heat exchanger pipe hole 2103, and an accumulator pipe hole 2104 to which the compressor discharge pipe 3, the first heat exchanger refrigerant pipe 13, the second heat exchanger refrigerant pipe 43, and the accumulator connecting pipe 53 are connected respectively are provided.

The compressor pipe hole 2101, the first heat exchanger pipe hole 2102, the second heat exchanger pipe hole 2103, and the accumulator pipe hole 2104 may be provided to communicate with the refrigerant filling chamber.

Meanwhile, the valve plate 2360 is disposed in close contact with the inner surface of the first housing 2110, and three inflow/outflow holes 2361, 2362 and 2363 are formed.

More specifically, the valve pad part 2390 continuously occupies any one (hereinafter, referred to as 'first hole 2361') of three inflow/outflow holes 2361, 2362, and 2363 formed in the valve plate 2360. In this state, when the valve pad part 2390 is rotated to one side or the other side, it occupies any one of the remaining two inflow/outflow holes 2362 and 2363 excluding the first hole 2361 among the three inflow/outflow holes (hereinafter, remaining two inflow/outflow holes 2362 and 2363 are collectively referred to as 'second hole 2362, 2363') to allow the occupied inflow/outflow holes to communicate with each other, thereby forming the above-described changed flow path.

Here, the first hole 2361 formed in the valve plate 2360 is related to the compressor discharge pipe 3, and may be defined as a 'high-pressure refrigerant inflow hole 2361'. In addition, one 2362 of the second holes 2362 and 2363 formed in the valve plate 2360 is related to the first heat exchanger refrigerant pipe 13, and may be defined as a 'first heat exchanger connecting hole 2362'. In addition, the other one 2363 of the second holes 2362 and 2363 formed in the valve plate 2360 is related to the second heat exchanger refrigerant pipe 43, and may be defined as a 'second heat exchanger connecting hole 2363'.

At this time, the valve plate 2360 may be disposed in close contact with the other side surface of the first housing 2110 that is closed in such a manner that the high-pressure refrigerant inflow hole 2361 is matched with the compressor pipe hole 2101 formed in the first housing 2110, the first heat exchanger connecting hole 2362 is matched with the first heat exchanger pipe hole 2102 formed in the first housing 2110, and the second heat exchanger connecting hole 2363 is matched with the second heat exchanger pipe hole 2103 formed in the first housing 2110. That is, the valve plate 2360 is disposed in such a manner that each of the inflow/outflow holes 2361, 2362, and 2363 is matched with remaining pipe holes 2101, 2102, and 2103 excluding the accumulator pipe hole 2104 of the first housing 2110, thereby forming a part of the inner surface of the first housing 2110.

Meanwhile, the valve pad part 2390 may be formed in a structure in which two communication holes 2391 and 2392 which are opened toward one surface of the valve plate 2360 are formed, and the two communication holes 2391 and 2392 communicate with each other and the refrigerant introduced into one side communication hole (one of the communication holes indicated by 2391 and 2392) is discharged to the other side communication hole (the other of the communication holes indicated by 2391 and 2392), or the refrigerant introduced into the other side communication hole can be discharged to the one side communication hole.

It is preferable that the valve pad part 2390 is provided in such a manner that the above described two communication holes 2391 and 2392 are in close contact with one surface of the valve plate 2360 so as to be rotated. This is to prevent the high-temperature and high-pressure refrigerant discharged from the compressor 1 from leaking to the refrigerant filling chamber immediately, without passing through the two communication holes 2391 and 2392 of the above described valve pad part 2390.

A spring member may be further provided to improve the adhesion of the valve pad part 2390 to the valve plate 2360.

In addition, one surface of the valve plate 2360 to which the valve pad part 2390 is closely contacted is preferably formed of a polishing material having a small friction so that the valve pad part 2390 is minimally abraded by friction.

In addition, the valve plate 2360 is not formed to cover all of the closed other side surface of the first housing 2110, but is formed to exclude the above-described accumulator pipe hole 2104, thereby providing an advantage that the weight of the product can be reduced.

The two communication holes 2391 and 2392 of the valve pad part 2390 occupy the first hole 2361 which is the high pressure refrigerant inflow hole 2361 at all times when the valve pad part 2390 rotates to one side or rotates to the other side, occupy the first heat exchanger connecting hole 2362 of the second holes 2362 and 2363 simultaneously together with the first hole 2361 when rotating toward one side, and occupy the second heat exchanger connecting hole 2363 of the second holes 2362 and 2363 simultaneously together with the first hole 2361 when rotating toward one side Here, when the two communication holes 2391 and 2392 of the valve pad part 2390 simultaneously occupy the first hole 2361 and the first heat exchanger connecting hole 2362 of the second holes 2362 and 2363, the high-temperature and high-pressure refrigerant discharged from the compressor 1 flows into the valve pad part 2390 through the first connection port 2141 in a state of being shielded from the refrigerant filling chamber, and then the refrigerant flow path is switched so that the refrigerant is supplied to the first heat exchanger 20 through the first heat exchanger connecting hole 2362 and the second connection port 2142.

In addition, when the two communication holes 2391 and 2392 of the valve pad part 2390 simultaneously occupy the first hole 2361 and the second heat exchanger connecting hole 2363 of the second holes 2362 and 2363, the high-temperature and high-pressure refrigerant discharged from the compressor 1 flows into the valve pad part 2390 through the first connection port 2141 in a state of being shielded from the refrigerant filling chamber, and then the refrigerant flow path is switched so that the refrigerant is supplied to the first heat exchanger 20 through the second heat exchanger connecting hole 2363 and the third connection port.

Meanwhile, as shown in FIGS. 13 to 16, a preferred embodiment of the four-way valve for switching the refrigerant flow path according to the present invention may further include a rotation drive part 2200 for generating and transmitting a driving force to rotate the valve pad part 2390, and a deceleration part 2300, disposed between the rotation drive part 2200 and the valve pad part 2390, for increasing the drive torque transmitted from the rotation drive part 2200.

Here, the rotation drive part 2200 may be a motor in which a rotor (not shown) is rotated when power is input. In particular, the rotation drive part 2200 may be a DC motor for generating a certain rotation torque according to a certain voltage among various types of motors.

Meanwhile, the deceleration part 2300 may be implemented by a gear train including a plurality of gears 2311, 2313, and 2315 that receive driving force from the rotation drive part 2200 and output with a changed gear ratio.

The plurality of gear trains are installed in the mounting plate 2500.

Here, as shown in FIGS. 13 to 16, the mounting plate 2500 is disposed to partition a space (hereinafter, referred to as a 'drive part space') provided with the refrigerant filling chamber and the rotation drive part 2200, and the rotation shafts of the plurality of gears 2311, 2315, and 2313 can be rotatably supported.

That is, the mounting plate 2500 serves to partition the refrigerant filling chamber and the drive part space. At the same time, one surface of the mounting plate 2500 corresponding to the drive part space serves to provide a mounting part in which the rotation drive part 2200 and the plurality of gear 2311, 2313, and 2315 forming the gear train can be installed, and simultaneously, the other surface of the mounting plate 2500 corresponding to the refrigerant filling chamber serves to provide a mounting part in which a transmission gear part 2370 described later and a rotation support shaft 2386 can be rotatably installed.

Figure 18A:
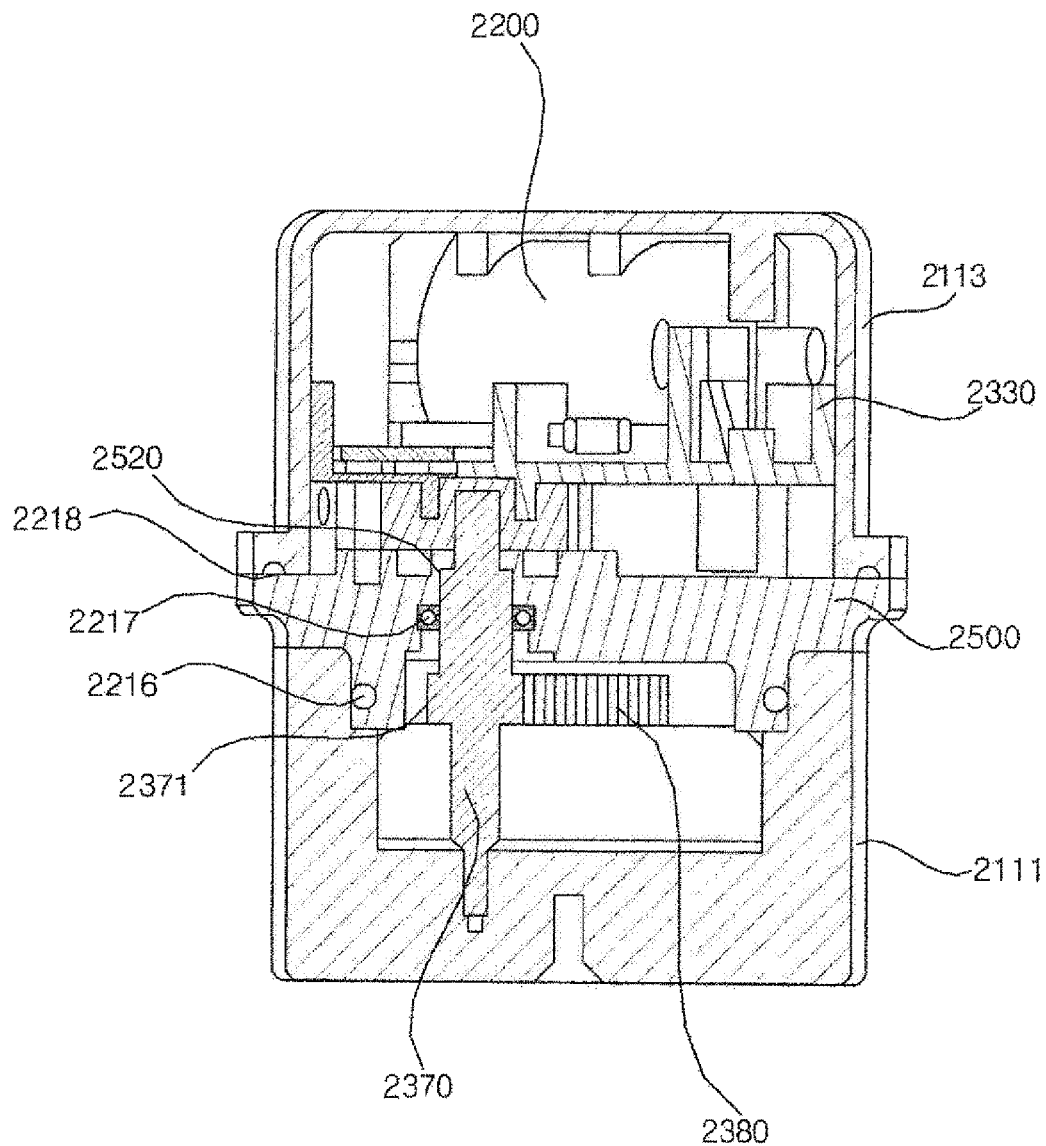
FIG. 18A is a cross-sectional view taken along the line A-A in FIG. 13.

FIG. 18A is a cross-sectional view taken along the line A-A in FIG. 13.

Figure 18B:
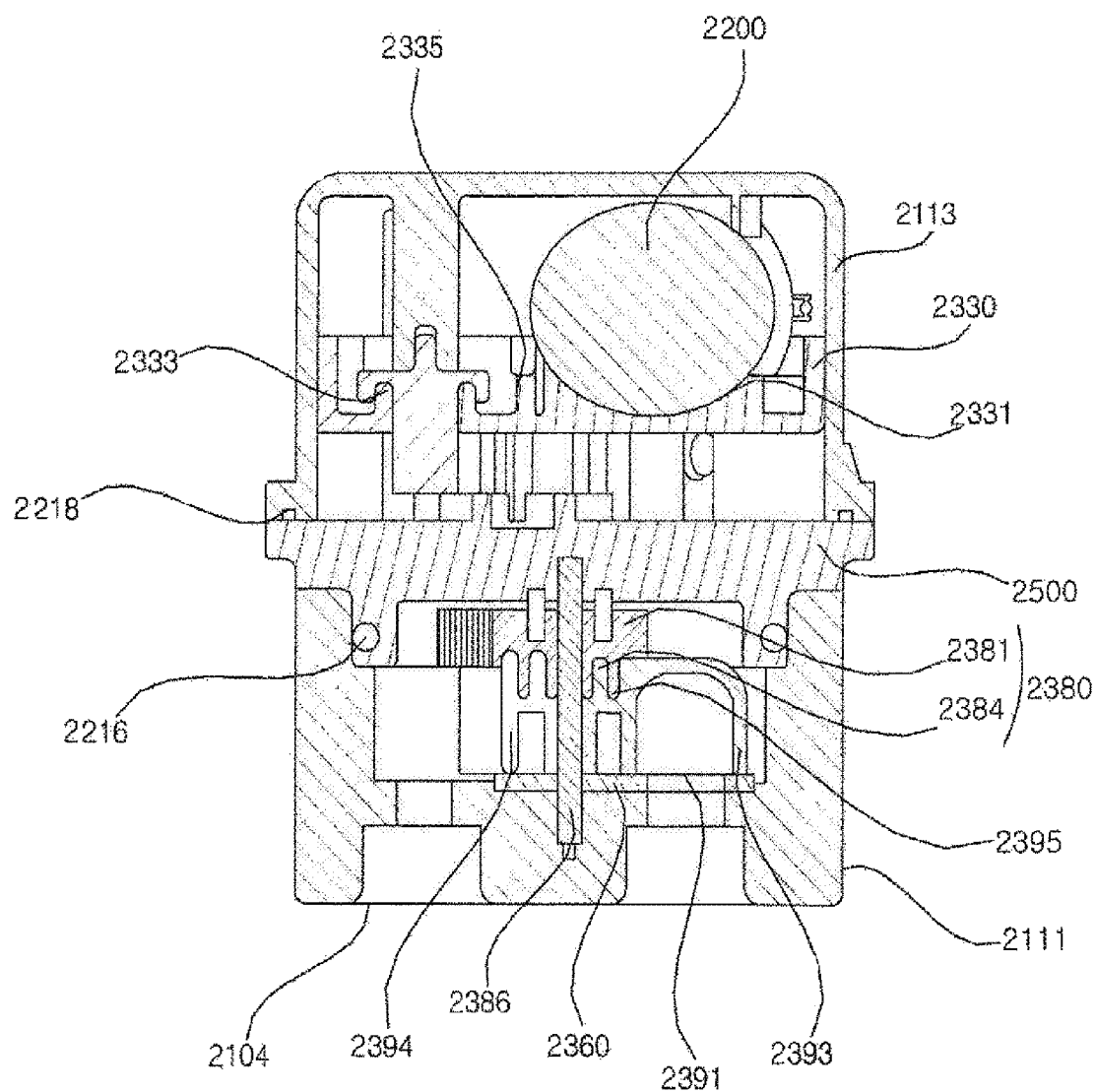
FIG. 18B is a cross-sectional view taken along the line B-B in FIG. 13.

FIG. 18B is a cross-sectional view taken along the line B-B in FIG. 13.

More specifically, as shown in FIGS. 18A and 18B, the mounting plate 2500 may partition the refrigerant filling chamber and the drive part space by an operation of being seated and coupled to cover the upper part of the first housing 2110.

The upper edge of the mounting plate 2500 is formed with a first coupling flange 2530 protruding in the horizontal direction so as to be larger than the outer diameter of the first housing 2110. In addition, as shown in FIG. 13, a second coupling flange 2114 having the same outer diameter as the first coupling flange 2530 is formed in the lower end outer edge of the second housing 2130.

Further, on the outer circumferential surface of the second housing 2130, a plurality of bolt coupling grooves 2115 are formed apart from each other while being formed vertically from the upper end up to the upper surface of the second coupling flange 2114 from the upper end, and being recessed inward from the outer circumferential surface of the second housing 2130.

A bolt coupling hole 2116 is formed in the second coupling flange 2114 corresponding to the inside of the plurality of bolt coupling grooves 2115 such that a coupling bolt 2170 described later penetrates vertically. In addition, in the mounting plate 2500, a bolt through hole 2540 is formed at a position corresponding to the bolt coupling hole 2116, and a bolt fastening hole 2111a to which the lower end of the coupling bolt 2170 is fastened may be formed in the upper end of the first housing 2110.

Here, the first housing 2110, the second housing 2130, and the mounting plate 2500 can be firmly coupled by the coupling bolt 2170 passing through the bolt coupling hole 2116 of the second housing 2130, the bolt through hole 2540 of the mounting plate 2500, and the bolt fastening hole 2111a of the first housing 2110 sequentially.

Meanwhile, as shown in FIG. 13, a preferred embodiment of the four-way valve for switching the refrigerant flow path according to the present invention may further include a middle housing 2330 that is disposed in the drive part space and protects the rotation drive part 2200 and an input gear part 2310.

In the middle housing 2330, a motor seating part 2331 on which the rotation drive part 2200 is seated, a seating hole 2333 through which respective vertical shafts that serve as rotation shaft of an input gear part 2310 are disposed to pass, and a gear seating part 2335 may be formed.

As shown in FIGS. 13 and 14, the plurality of gear trains may include an input gear part 2310 which is disposed in the drive part space partitioned based on the mounting plate 2500 and receives a driving force from the rotation drive part 2200.

As shown in FIGS. 13 and 15, the plurality of gear trains may include an output gear part 2380 which is disposed in the refrigerant filling chamber based on the mounting plate 2500 and rotates the valve pad part 2390 at a rotational speed of a changed gear ratio.

As shown in FIGS. 14 and 15, the plurality of gear trains may include a transmission gear part 2370, which is disposed to penetrate through the mounting plate 2500, that is engaged with the input gear part 2310 disposed in the drive part space and engaged with the output gear part 2380 disposed in the refrigerant filling chamber.

More specifically, the rotation drive part 2200 includes a worm gear part 2201 provided at the tip of a rotation shaft (not shown) of the rotor disposed horizontally above the mounting plate 2500, as shown in the drawing, corresponding to the drive part space. That is, it can be understood that the rotation shaft of the rotor has a horizontal axis.

Here, one of the input gear part 2310 is engaged with the worm gear of the worm gear part 2201 and changes and transmits the driving force of the rotation drive part 2200 with a certain gear ratio.

As shown in FIGS. 13 and 14, the input gear part 2310 may be implemented by a combination of a plurality of gears 2311, 2313, and 2315. That is, the first input gear 2311 which is directly engaged with the gear teeth of the worm gear part 2201 and changes the gear ratio to a first change gear ratio, and rotates to one side or the other side in the horizontal direction about the vertical rotation axis, a second input gear 2313 which is engaged with the first input gear 2311 and changes the gear ratio to a second change gear ratio to transmit the driving force, a third input gear 2315 which is engaged with the second input gear 2313 and changes the gear ratio to a third change gear ratio to transmit the driving force to the transmission gear part 2370.

Referring to FIGS. 13 and 15, the driving force inputted from the worm gear part 2201 of the rotation drive part 2200 is amplified by the gear ratio changed three times to increase the driving torque of the valve pad part 2390 while being sequentially engaged with the first input gear 2311, the second input gear 2313, and the third input gear 2315 and being rotated.

The first input gear 2311 is provided with a main gear 2311a having a relatively large diameter and a second gear having a sub gear 2311b having a relatively small diameter installed at the upper portion or lower portion of the main gear 2311a, and may be designed to be able to appropriately change the gear ratio so that the driving torque to be provided by the valve pad part 2390 can be formed.

The second input gear 2313 is provided with a main gear 2311a having a relatively large diameter and a second gear having a sub gear 2311b having a relatively small diameter installed at the upper portion or lower portion of the main gear 2311a, and may be designed to be able to appropriately change the gear ratio so that the driving torque to be provided by the valve pad part 2390 can be formed.

Here, as described above, the first input gear 2311 serves to transmit the driving force horizontally transmitted through the rotation shaft of the rotor having the horizontal axis in the vertical direction.

Meanwhile, the main gear 2311*a* of the first input gear 2311 is engaged with the helical worm gear of the worm gear part 2201 and required to transmit the driving force in the orthogonal direction, and thus preferably provided as a helical gear. The sub gear 2311*b* of the first input gear 2311 may be provided as a general pinion gear.

In the preferred embodiment of the present invention, both the first input gear 2311 and the second input gear 2313 have vertical shafts disposed vertically, the main gear 2313*a* of the second input gear 2313 is provided as a pinion gear engaged with the sub gear 2311*b* of the first input gear 2311, and the sub gear 2313*b* of the second input gear 2313 is formed to be smaller only in diameter than the main gear 2313*a* and may be provided as a pinion gear.

Meanwhile, unlike the first input gear 2311 and the second input gear 2313, the third input gear 2315 is not divided into the main gear and the sub gear, but the upper end of the transmission gear part 2370 is inserted so that the transmission gear part 2370 itself serves as a rotation shaft. It is obvious that the third input gear 2315 may also be provided as a pinion gear which is engaged with the sub gear 2313*b* of the second input gear 2313.

That is, in a preferred embodiment of the present invention, the driving force generated from the rotation drive part 2200 is sequentially transmitted from the drive part space to the refrigerant filling chamber side through the main gear 2311*a* of the first input gear 2311, the sub gear 2311*b* of the first input gear 2311, the main gear 2313*a* of the second input gear 2313, the sub gear 2313*b* of the second input gear 2313, the third input gear 2315, and the transmission gear portion 2370.

Here, the center of the third input gear 2315 is vertically penetrated so that the upper end part of the transmission gear part 2370 can penetrate and be fastened. Thus, the transmission gear part 2370 is also rotated when the third input gear 2315 rotates.

As shown in FIG. 16, a pinion gear 371 is formed on the outer circumferential surface of the refrigerant filling chamber side of the transmission gear part 2370, and the pinion gear 371 of the transmission gear part 2370 rotates the output gear part 2380 made of the pinion gear different from the outer diameter.

As shown in FIG. 16 and FIG. 18B, the output gear part 2380 includes an output gear main body 2381 having the above-described pinion gear formed on the outer circumferential surface thereof, and a plurality of fastening ribs 2384 which is extended to the lower portion of the output gear main body 2381 and are inserted into and fastened to the upper portion of the valve pad part 2390.

That is, the output gear part 2380 and the valve pad part 2390 may be provided so as to be interlocked with the valve pad part 2390 when the output gear part 2380 receives the driving force from the input gear part 2310.

To this end, as shown in FIGS. 13 and 16, when rotated in conjunction with a coupling part 2394 connected to the output gear part 2380, and the output gear part 2380, the valve pad part 2390 may include a switching part 2393 for communicating the first hole 2361 and the second hole 2362, 2363 of the valve plate 2360 to switch the flow direction of the refrigerant.

Here, the coupling part 2394 includes a shaft through hole 2396 through which a rotation support shaft 2386, one end of which is fixed to the lower surface of the mounting plate 2500 and the other end is fixed inside the closed other side surface of the first housing 2110, and a plurality of coupling grooves 2395 which are annularly grooved in the periphery of the shaft through hole 2396.

In the preferred embodiment of the four-way valve 2000 for switching the refrigerant flow path according to the present invention, the rotation support shaft 2386 is provided to penetrate the entire rotational center of the valve pad part 2390, but provided to perform only the function of supporting the valve pad part 2390 without being involved in the rotational driving of the valve pad part 2390. Thus, the driving force generated from the rotation drive part 2200 is directly transmitted to the valve pad part 2390 via an intermediate gear, i.e. the output gear part 2380, thereby transmitting the driving force so that a sufficiently high initial driving torque can be generated.

Although not shown in the drawings, the plurality of coupling grooves 2395 are not completely annular, but may be disposed in such a manner that four coupling grooves 2395 are spaced apart at intervals of 90 degrees in the circumferential direction to form a substantially annular shape.

In addition, the plurality of fastening ribs 2384 formed on the lower surface of the output gear part 2380 are inserted into and fastened to the plurality of coupling grooves 2395 provided in the coupling part 2394 of the valve pad part 2390. To this end, a plurality of coupling grooves 2395 are formed to be opened upward in the figure, and the plurality of fastening ribs 2384 are inserted into and coupled from the upper side to the lower side of a plurality of coupling grooves 2395 opened upward.

When the plurality of fastening ribs 2384 are completely inserted into the plurality of coupling grooves 2395, when the output gear part 2380 is rotated by engagement with the transmission gear part 2370, the valve pad part 2390 can also be rotated about the rotation support shaft 2386 in cooperation with each other.

Here, a support shaft through hole 2385 through which the rotation support shaft 2386 passes is formed at the center of the output gear part 2380. The rotation support shaft 2386, as described above, passes through the shaft through hole 2396 of the valve pad part 2390 and the support shaft through hole 2385 of the output gear part 2380 at the same time, so that the valve pad part 2390 and the output gear part 2380 are simultaneously supported.

Meanwhile, in a preferred embodiment of the four-way valve 2000 for switching the refrigerant flow path according to the present invention, as described above, the rotation drive part 2200 is provided as a DC motor. Although the DC motor has an advantage of generating a high driving torque by using a DC power source, there is a disadvantage in that it is not easy to achieve a change control at an accurate position due to the residual driving force of the motor.

A preferred embodiment of the four-way valve 2000 for switching a refrigerant flow path according to the present invention employs a DC motor as a rotation drive part 2200, and the following two technical elements are provided for facilitating the rotation control of the DC motor.

Figure 17:
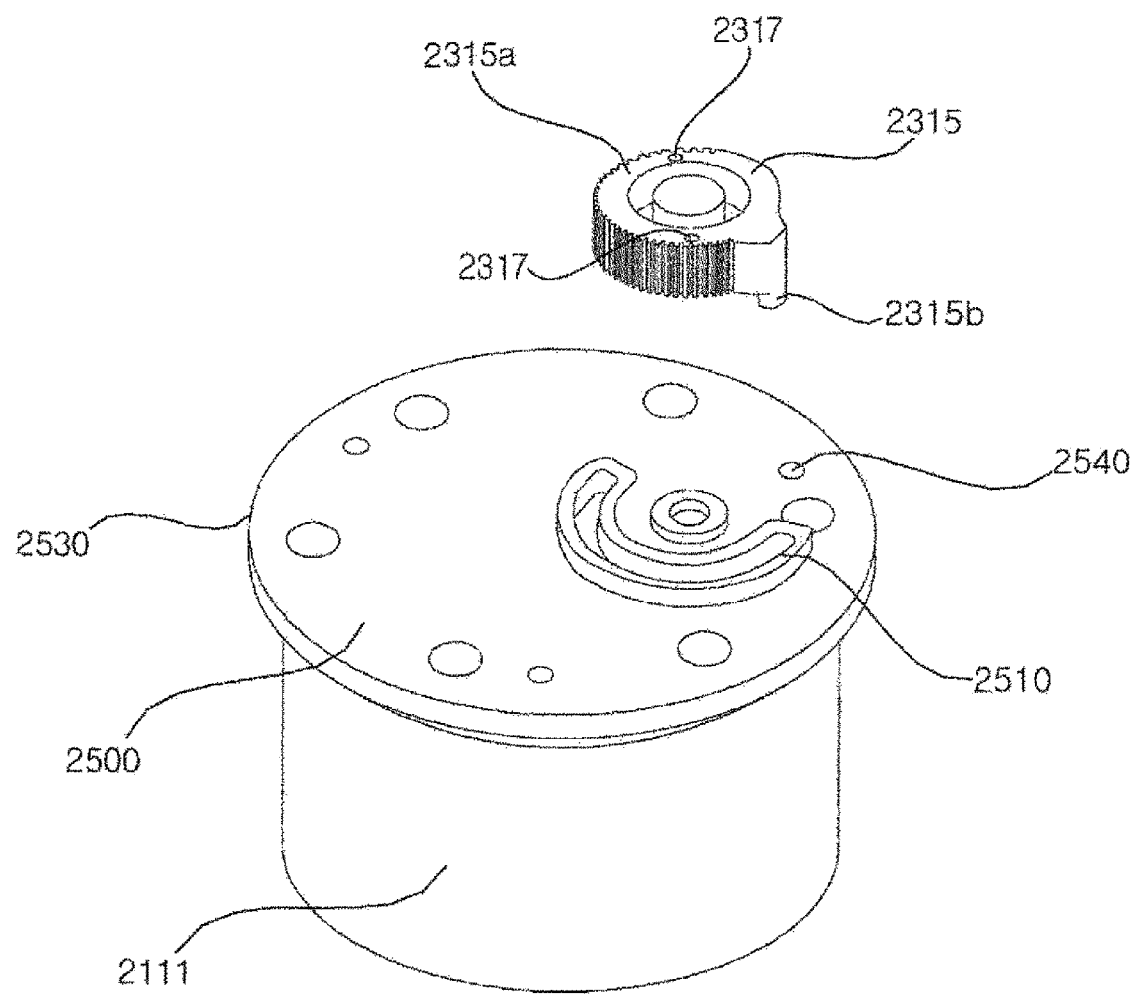
FIG. 17 is an exploded perspective view showing a rotation limiting configuration of a valve pad part among configurations of FIG. 13.

First, as shown in FIG. 17, in the third input gear 2315, a pair of magnets 2317 for sensing the origin when the valve pad part 2390 rotates are provided apart from each other, and a single Hall IC sensor 2331 for generating a certain signal due to interaction with the pair of magnets 2317 may be provided on a PCB 2331*a* provided in a middle housing 2330.

It is preferable that the pair of magnets 2317 are disposed be spaced apart on the upper portion of the third input gear 2315 positioned close to the lower surface of the middle housing 2330 and positioned within the same radius from the center of rotation.

The arrangement position of one of the magnets 2317 may consider a rotation section due to the residual rotational force of the rotation drive part 2200, but may be set to a position where two communication holes 2391 and 2392 of the valve pad part 2390 can stably occupy the high-pressure refrigerant inflow hole 2361 which is a first hole 2361 formed in the valve plate 2360, and the first heat exchanger connecting hole 2362 among the second holes 2362 and 2363.

In addition, the arrangement position of the other of the magnets 2317 may also consider a rotation section due to the residual rotational force of the rotation drive part 2200, but may be set to a position where two communication holes 2391 and 2392 of the valve pad part 2390 can stably occupy the high-pressure refrigerant inflow hole 2361 which is a first hole 2361 formed in the valve plate 2360, and the second heat exchanger connecting hole 2363 among the second holes 2362 and 2363.

Second, as shown in FIG. 17, the third input gear 2315 is formed with a partial gear teeth 2315a which is engaged with the sub gear 2313b of the second input gear 2313 on a part of the outer circumferential surface, and a stopper end 2315b protruding downward from a remaining part of the outer circumferential surface may be formed.

The stopper end 2315b is rotated to one side or the other side by an operation that the partial gear teeth 2315a of the third input gear 2315 is engaged with the sub gear 2313b of the second input gear 2313, which interferes with the upper surface of the mounting plate 2500 at one side and the other side of the rotating direction to restrict the rotation of the valve pad part 2390.

As shown in FIG. 17, the lower end of the stopper end 2315b of the third input gear 2315 is inserted into the upper surface of the mounting plate 2500 so that the third input gear 2315 is moved in the one direction or the other direction And a stopper slot 2510 provided in a slot shape so that the stopper end 2315b interferes with one side of the rotation direction while the stopper end 2315b interferes with the other side of the rotation direction.

On the upper surface of the mounting plate 2500, as shown in FIG. 17, a stopper slot 2510 provided in a slot shape may be provided. Thus, when the lower end of the stopper end 2315b of the third input gear 2315 is inserted and the third input gear 2315 is rotated in one direction or the other direction, it guides the rotation of the third input gear 2315, and interferes with the stopper end 2315b at one side of the rotation direction and interferes with the stopper end 2315b at the other side of the rotation direction.

Effectively, the stopper end 2315b is formed in the third input gear 2315 and serves to restrict the rotation of the third input gear 2315. However, as a result, it has the same meaning as serving to restrict the rotation of the valve pad part 2390.

The third input gear 2315 serves to transmit the rotational force transmitted from the second input gear 2313 to the valve pad part 2390 through a certain gear ratio change. At this time, one side rotation restriction position of the stopper end 2315b of the third input gear 2315 may be set to a position where two communication holes 2391 and 2392 of the valve pad part 2390 can stably occupy the high-pressure refrigerant inflow hole 2361 which is a first hole 2361 formed in the valve plate 2360, and the first heat exchanger connecting hole 2362 among the second holes 2362 and 2363.

In addition, the other side rotation restriction position of the stopper end 2315b of the third input gear 2315 may be set to a position where two communication holes 2391 and 2392 of the valve pad part 2390 can stably occupy the high-pressure refrigerant inflow hole 2361 which is a first hole 2361 formed in the valve plate 2360, and the second heat exchanger connecting hole 2363 among the second holes 2362 and 2363.

Here, at least one of the stopper end 2315b and the stopper slot 2510 may be made of a rubber material so as to prevent friction noise between them. Preferably, it is also possible that a noise prevention pad (not shown) is adhered to the mutual contact surface of the stopper end 2315b and the stopper slot 2510.

That is, a preferred embodiment of the four-way valve for switching the refrigerant flow path according to the present invention is configured to achieve an electronically stable control through the pair of magnets 2317 and the single Hall IC sensors 2331, and achieve a physically stable control through the stopper end 2315 and the stopper slot 2510, thereby further improving the stability of product driving.

Meanwhile, as shown in FIG. 13, it is already described that the inner space of the housing part 2100 is partitioned into the lower refrigerant filling chamber and the upper drive part space by the mounting plate 2500.

Here, the portion where the refrigerant accommodated in the refrigerant filling chamber of the housing part 2100 leaks to the outside or the to drive part space may be restricted to a space between the mounting plate 2500 and the first housing 2110 and a space between a gear through hole 2520 formed in the mounting plate 2500 to allow the transmission gear part 2370 to passes through and the outer circumferential surface of the transmission gear part 2370.

In order to prevent the refrigerant accommodated in the refrigerant filling chamber from leaking to the outside of the housing part 2100, a preferred embodiment of the four-way valve for switching the refrigerant flow path according to the present invention may further include a first O-ring 2216 disposed between the mounting plate 2500 and the first housing 2110.

As shown in FIGS. 14, 16 and 18A, the first O-ring 2216 is provided between the first housing 2110 and the mounting plate 2500, both of which are fixed regardless of the rotational driving of the rotation drive part 2200, thereby achieving a less risk of damage due to abrasion.

Meanwhile, in order to prevent the refrigerant accommodated in the refrigerant filling chamber from leaking to the drive part space, in a preferred embodiment of the four-way valve for switching the refrigerant flow path according to the present invention, a second O-ring 2317 may be interposed between the gear through hole 2520 of the mounting plate 2500 and the transmission gear part 2370. More specifically, the second O-ring 2217 is coupled to be closely in contact with the inner circumferential surface of the gear through hole 2520 while being interposed in the outer circumference of the transmission gear part 2370.

Here, as shown in FIGS. 14, 16 and 18A, since the second O-ring 2217 is configured to be interposed between the transmission gear part 2370 rotated substantially in association with the rotation driving of the rotation drive part 2200 and the gear through hole 2520 that is in a fixed state, it may be provided with a quad-ring having a relatively low friction coefficient and a low compression ratio to achieve less abrasion.

The quad-ring has an excellent sealing performance in comparison with a general O-ring such as the first O-ring, can improve a sealing function of a configuration of rotating or reciprocating motion, and has an advantage of excellent durability.

Meanwhile, as shown in FIGS. 13 and 15, a preferred embodiment of the four-way valve for switching the refrigerant flow path according to the present invention may further include at least one inflow/outflow hole 2104 (hereinafter, referred to as a 'third hole 2104' to distinguish from the 'first hole 2361' and the 'second hole 2362, 2363') formed to penetrate the closed bottom surface of the housing part 2100, particularly, the first housing 2110.

As shown in FIGS. 14 and 16, when the valve plate 2360 is formed in an eccentric shape rather than a circular shape, the third hole 2104 may be provided to immediately discharge the refrigerant filled in the refrigerant filling chamber.

In addition, the accumulator connecting pipe 53 is connected to the outer surface of the first housing 2110 corresponding to the outside of the third hole 2104. Therefore, the third hole 2104 may be defined as 'low-pressure refrigerant discharge hole 2104' as it is a path for supplying the low-pressure refrigerant discharged from the connection hole not occupied by the two communication holes 2391 and 2392 of the valve pad part 2390 among the first heat exchanger connecting hole 2362 and the second heat exchanger connecting hole 2363 to the accumulator 50, while communicating with the accumulator connecting pipe 53.

Figure 19A:
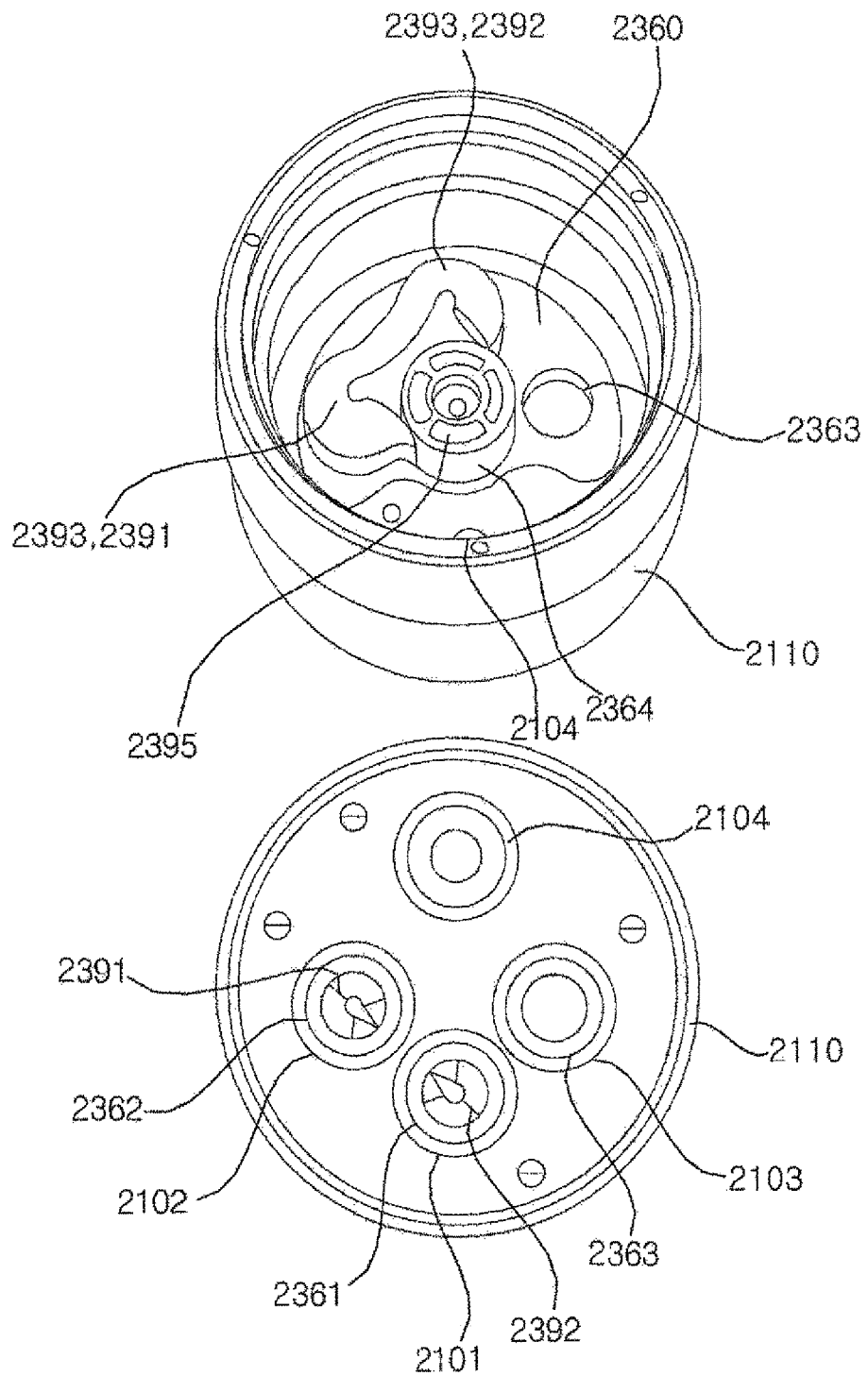
FIG. 19A and FIG. 19B are a perspective view and a bottom view showing the operation relation of a valve pad part.
Figure 19B:
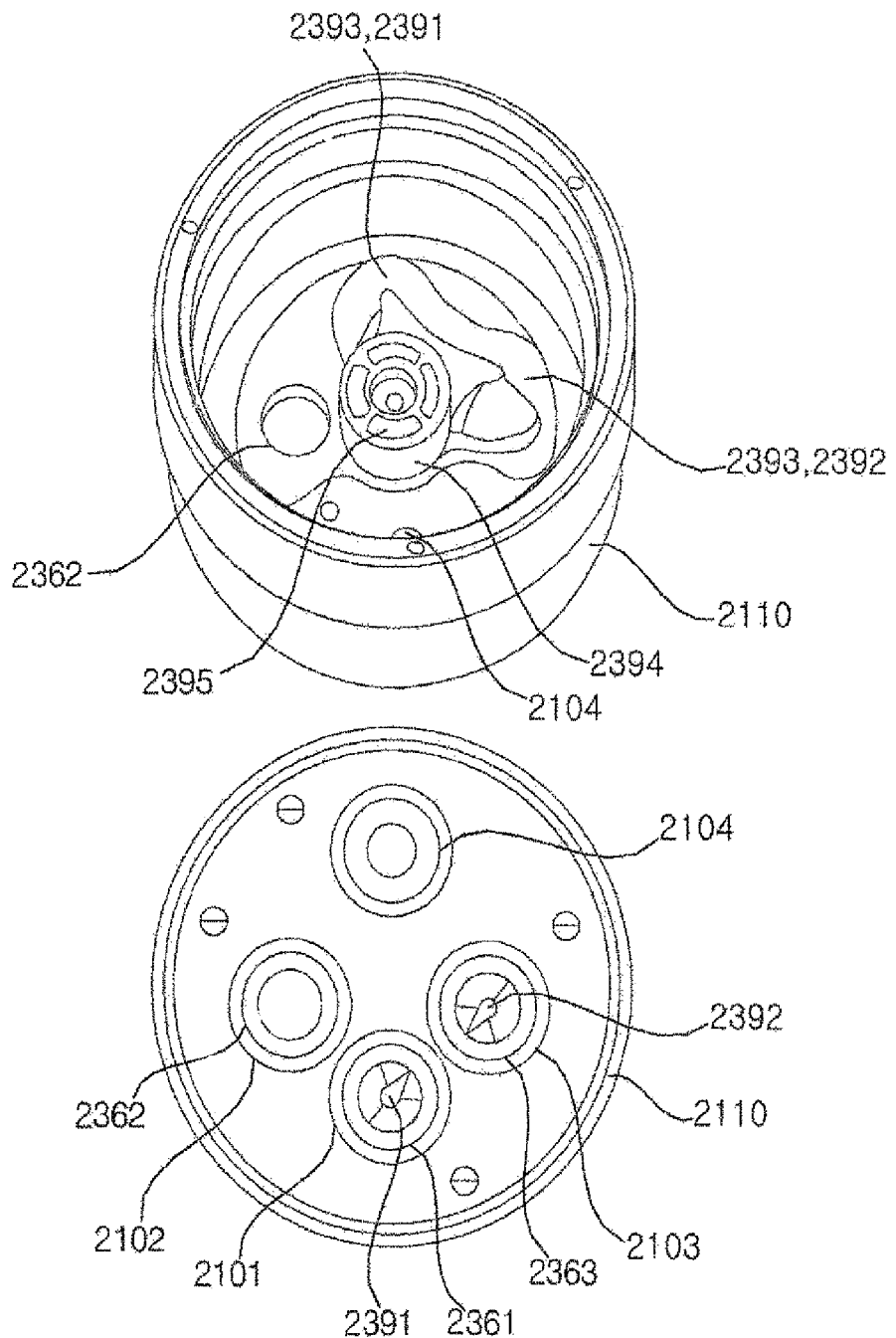

FIG. 19A and FIG. 19B are a perspective view and a bottom view showing the operation relation of a valve pad part.

The refrigerant flow path switching according to the preferred embodiment of the four-way valve for switching the refrigerant flow path according to the present invention will be briefly described with reference to the accompanying drawings.

A heat exchanger provided outside the HVAC housing 60 is referred to as a first heat exchanger 20, and a heat exchanger provided inside the HVAC housing 60 is referred to as a second heat exchanger 40.

First, when the vehicle air conditioner of a vehicle is operated in the cooling mode, as shown in FIGS. 1A and 19A, the compressor 1 is operated to discharge the high-temperature and high-pressure refrigerant into the housing part 2100. At this time, the valve pad part 2390 is driven to occupy the high-pressure refrigerant inflow hole 2361 and the first heat exchanger connecting hole 2362, the high-pressure refrigerant discharged from the compressor 1 flows into the valve pad part 2390 through the high-temperature refrigerant inflow hole 2361, then is discharged to the first heat exchanger 20 through the first heat exchanger connecting hole 2362 and condensed, then is evaporated in the second heat exchanger 40, then flows into the refrigerant filling chamber again through the second heat exchanger connecting hole 2363, and then is recovered to the accumulator 50 through the low-pressure refrigerant discharge hole 2104.

On the other hand, when the vehicle air conditioner of the vehicle is operated in the heating mode, as shown in FIGS. 1B and 19B, the compressor 1 is operated to discharge the high-temperature and high-pressure refrigerant into the housing part 2100. At this time, the valve pad part 2390 is driven to occupy the high-pressure refrigerant inflow hole 2361 and the second heat exchanger connecting hole 2363, the high-pressure refrigerant discharged from the compressor 1 flows into the valve pad part 2390 through the high-temperature refrigerant inflow hole 2361, then is discharged to the second heat exchanger 40 through the second heat exchanger connecting hole 2363 and condensed, then is evaporated in the second heat exchanger 40, then flows into the refrigerant filling chamber again through the first heat exchanger connecting hole 2362, and then is recovered to the accumulator 50 through the low-pressure refrigerant discharge hole 2104.

According to an embodiment of the four-way valve for switching the refrigerant flow path according to the present invention, even when the high temperature and high pressure refrigerant is discharged to the inside of the housing part 1100, since the driving force from the rotation drive part 1200 is decelerated by the deceleration part 1300 at a certain deceleration ratio, the valve pad part 1390 is rotated in such a manner that a higher driving torque is generated to sufficiently overcome the frictional force generated during rotation of the valve pad part 1390, thereby enhancing the performance of the product.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims. Accordingly, the scope of the present invention is not construed as being limited to the described embodiments but is defined by the appended claims as well as equivalents thereto.

[Description of numeral]

| | |
|---|---|
| 1: compressor | 20: first heat exchanger |
| 30: expansion valve | 40: second heat exchanger |
| 50: accumulator | 60: HVAC housing |
| 1000: four-way valve | 1100: housing part |
| 1200: rotation drive part | 1300: deceleration part |
| 1360: valve plate | 1390: valve pad part |
| 1400: cover case | 1500: mounting plate |
| 2000: four-way valve | 2100: housing part |
| 2200: rotation drive part | 2300: deceleration part |
| 2360: valve plate | 2390: valve pad part |
| 2500: mounting plate | |

The invention claimed is:

1. A four-way valve for switching a refrigerant flow path, the valve comprising:
a housing part that has a cylindrical shape and that includes a refrigerant filling chamber which is filled with a refrigerant;
a valve plate disposed at one side of the housing part and having at least three valve holes formed therein;
a valve pad part disposed in the refrigerant filling chamber, rotating to contact a surface of the valve plate, continuously occupying a first valve hole of the at least three valve holes, and selectively occupying a second valve hole of the at least three valve holes so as to make the occupied valve holes communicate with each other, thereby forming a changed flow path;
a rotation drive part configured to transfer a driving force to rotate the valve pad part; and
a deceleration part that is disposed between the rotation drive part and the valve pad part and that is configured to increase a driving torque transferred from the rotation drive part,
wherein the housing part comprises at least three inflow/outflow holes formed therein,
wherein the first valve hole and a first housing hole of the at least three inflow/outflow holes that is opposite to the first valve hole (i) communicate with each other by a first connection port and (ii) are shielded from the refrigerant filling chamber, wherein the second valve hole and a second housing hole of the at least three inflow/outflow holes that is opposite to the second valve hole (i) communicate with each other by a second connection port and (ii) are shielded from the refrigerant filling chamber, wherein a third valve hole of the at least three valve holes and a third housing hole of the at least three inflow/outflow holes that is opposite to the third valve hole (i) communicate with each other by a third connection port and (ii) are shielded from the refrigerant filling chamber, wherein the valve plate has a non-circular shape, and wherein a housing hole of the at least three inflow/outflow holes and a valve hole of the at least three valve holes that is not occupied by the valve pad part communicate with each other through the refrigerant filling chamber.

2. The valve of claim 1, wherein the deceleration part comprises a gear train including a plurality of gears configured to receive a driving force from the rotation drive part and output by changing a gear ratio.

3. The valve of claim 2, further comprising a mounting plate which is disposed to partition a drive part space provided with the refrigerant filling chamber and the rotation drive part, and in which a rotation shaft of the plurality of gears are installed to be rotatably supported.

4. The valve of claim 3, wherein the gear train comprises:
an input gear part disposed in the drive part space partitioned based on the mounting plate, and configured to receive a driving force from the rotation drive part;
an output gear part disposed in the refrigerant filling chamber based on the mounting plate, and configured to rotate the valve pad part at a rotational speed of a changed gear ratio; and
a transmission gear part disposed to (i) penetrate through the mounting plate and (ii) be engaged with the input gear part while being engaged with the output gear part.

5. The valve of claim 4, wherein the rotation drive part is disposed in such a manner that a rotation shaft simultaneously passes through the valve plate, the mounting plate, and the valve pad part that are relatively rotated,
wherein the input gear part is formed of a pinion gear body having a plurality of pinion gears to be engaged with a pinion gear provided on an outer circumferential surface of the rotation shaft.

6. The valve of claim 4, wherein the rotation drive part is disposed in such a manner that a rotation shaft simultaneously passes through the valve plate, the mounting plate, and the valve pad part that are relatively rotated,
wherein the output gear part and the valve pad part are connected to be interlocked with each other.

7. The valve of claim 6, wherein the valve pad part comprises:
a coupling part connected to the output gear part; and
a switching part configured to communicate the first valve hole and the second valve hole to switch a flow direction of the refrigerant when rotated in conjunction with the output gear part.

8. The valve of claim 7, wherein the coupling part is provided with a shaft through hole through which the rotation shaft passes and a plurality of coupling grooves formed in an annular shape around the shaft through hole,
wherein the output gear part is provided with a plurality of coupling ribs inserted into and fastened with the plurality of coupling grooves, respectively.

9. The valve of claim 6, wherein the output gear part comprises:
a shaft through hole through which the rotation shaft passes;
a partial gear teeth partly formed in a pinion gear shape so as to be engaged with the transmission gear part;
a stopper end extended to prevent over-rotation of the valve pad part due to interference with one side of the rotation direction of the output gear part and interference with the other side of the rotation direction of the output gear part in the inner side of the housing part.

10. The valve of claim 9, wherein a contact end part protruding inwardly to interfere with the stopper end is provided on the inside of the housing part.

11. The valve of claim 1, further comprising:
a cover case,
wherein the housing part defines an opening where the rotation drive part is provided, and wherein the cover case is configured to cover the opening of the housing part to embed the rotation drive part.

12. The valve of claim 11, further comprising at least one housing O-ring interposed between the housing part and an opposed surface corresponding to the outside of the refrigerant filling chamber among opposed surfaces of the cover case.

13. The valve of claim 1, wherein the first valve hole is a refrigerant inflow hole configured to communicate with a compressor discharge pipe connected to a discharge port of a compressor,
wherein the second valve hole is a first heat exchanger connecting hole configured to communicate with a first heat exchanger refrigerant pipe connected to a first heat exchanger,
wherein the valve hole that is not occupied is a second heat exchanger connecting hole configured to communicate with a second heat exchanger refrigerant pipe connected to a second heat exchanger,
wherein the housing hole is a refrigerant discharge hole configured to communicate with an accumulator connecting pipe connected to an accumulator.

14. The valve of claim 13, wherein the compressor discharges a refrigerant into the valve pad part.

15. The valve of claim 14, wherein the changed flow path is switched such that the refrigerant is supplied to the second heat exchanger through the valve hole that is not occupied and the third connection port.

16. A four-way valve for switching a refrigerant flow path, the valve comprising:
a first housing part including a refrigerant filling chamber which is filled with a refrigerant;
a second housing coupled to the first housing part, and having a drive part space in which rotation drive part is disposed;
a mounting plate disposed between the first housing and the second housing so as to be partitioned into the refrigerant filling chamber and the drive part space;
a deceleration part that increases a driving torque due to a driving force transmitted from the rotation drive part of the drive part space and transmits the driving torque to the refrigerant filling chamber while passing through the mounting plate; and
a valve pad part rotatably that is disposed in the refrigerant filling chamber so as to be rotatable about a rotation support shaft, has an eccentric shape to one side with respect to the rotation support shaft, and is rotated with the driving torque transmitted from the deceleration part as an initial driving torque, wherein the deceleration part comprises:
- an input gear part disposed in the drive part space and rotated by receiving a driving force from the rotation drive part,
- an output gear part disposed in the refrigerant filling chamber and rotating the valve pad part at a rotational speed of a gear ratio changed by the input gear part, and
- a transmission gear part disposed so as to pass through a gear through hole formed in the mounting plate, and disposed to be engaged with the input gear part and the output gear part simultaneously.

17. The valve of claim 16, wherein a stopper end protruding downward is formed in the input gear part is formed,
wherein a stopper slot is formed in the mounting plate in such a manner that the rotation of the input gear part is restricted by an interfering operation of the stopper end at one side and the other side of the rotational direction of the input gear part.

18. The valve of claim 16, further comprising a middle housing disposed in the drive part space and configured to protect the rotation drive part and the input gear part.

19. The valve of claim 18, wherein the input gear part is provided with a pair of magnets spaced apart from each other for sensing an origin based on a rotation of the valve pad part,
wherein the middle housing is provided with a single Hall IC sensor for generating a certain signal due to interaction with the pair of magnets.

* * * * *